US011363652B2

(12) United States Patent
Raghavan et al.

(10) Patent No.: US 11,363,652 B2
(45) Date of Patent: Jun. 14, 2022

(54) ESTABLISHMENT OF A UE TO UE RELAY LINK

(71) Applicant: QUALCOMM Incorporated, San Diego, CA (US)

(72) Inventors: Vasanthan Raghavan, West Windsor Township, NJ (US); Tianyang Bai, Bridgewater, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 16/866,464

(22) Filed: May 4, 2020

(65) Prior Publication Data

US 2020/0359434 A1 Nov. 12, 2020

Related U.S. Application Data

(60) Provisional application No. 62/844,367, filed on May 7, 2019.

(51) Int. Cl.
| | |
|---|---|
| *H04W 76/14* | (2018.01) |
| *H04W 40/22* | (2009.01) |
| *H04B 7/06* | (2006.01) |
| *H04B 7/08* | (2006.01) |
| *H04W 56/00* | (2009.01) |

(Continued)

(52) U.S. Cl.
CPC .......... *H04W 76/14* (2018.02); *H04B 7/0695* (2013.01); *H04B 7/088* (2013.01); *H04W 40/22* (2013.01); *H04W 56/0045* (2013.01); *H04W 72/042* (2013.01); *H04W 72/046* (2013.01); *H04W 72/085* (2013.01); *H04W 74/0833* (2013.01); *H04W 88/04* (2013.01); *H04W 92/18* (2013.01)

(58) Field of Classification Search
CPC ..... H04W 76/14; H04W 40/22; H04W 88/04; H04W 72/046; H04W 72/042; H04W 56/0045; H04W 74/0833
See application file for complete search history.

(56) References Cited

U.S. PATENT DOCUMENTS

| | | | |
|---|---|---|---|
| 2018/0219664 A1 | 8/2018 | Guo et al. | |
| 2019/0043369 A1* | 2/2019 | Miller | G08G 5/0008 |
| 2019/0116605 A1* | 4/2019 | Luo | H04B 7/088 |

FOREIGN PATENT DOCUMENTS

WO WO-2019079052 A1 4/2019

OTHER PUBLICATIONS

International Search Report and Written Opinion—PCT/US2020/031436—ISA/EPO—dated Jul. 10, 2020.

* cited by examiner

*Primary Examiner* — Yemane Mesfin
*Assistant Examiner* — Henry Baron
(74) *Attorney, Agent, or Firm* — Holland & Hart LLP

(57) ABSTRACT

Methods, systems, and devices for wireless communications are described Generally, the described techniques provide for a base station transmitting a relay link beam sweep configuration to a first UE for establishing a relay link with a second UE. Based on the relay link beam sweep configuration, the first UE may perform a relay link beam sweep procedure with the second UE using a plurality of beams. Based at least in part on the relay link beam sweep procedure, the first UE may select a first beam pair. The first UE may establish a relay link with the second UE using the selected beam pair.

30 Claims, 21 Drawing Sheets

(51) Int. Cl.
*H04W 72/04* (2009.01)
*H04W 72/08* (2009.01)
*H04W 74/08* (2009.01)
*H04W 88/04* (2009.01)
*H04W 92/18* (2009.01)

ESTABLISHMENT OF A UE TO UE RELAY LINK

CROSS REFERENCE

The present Application for Patent claims the benefit of U.S. Provisional Patent Application No. 62/844,367 by RAGHAVAN et al., entitled "ESTABLISHMENT OF A UE TO UE RELAY LINK," filed May 7, 2019, assigned to the assignee hereof, and expressly incorporated by reference herein.

BACKGROUND

The following relates generally to wireless communications, and more specifically to establishment of a UE to UE relay link.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may include UEs capable of communicating directly with other UEs. In some cases, a first UE may operate as a relay between a base station and a second UE. In a downlink scenario, the first UE may receive signals from the base station and forward or retransmit the received signal to the second UE. In an uplink scenario, the first UE may receive signals from the second UE and forward or retransmit the received signal to the base station. In some wireless communications systems, various devices (e.g., UEs and base stations) may implement beamforming for improved signal transmission and reception quality. Efficient techniques for performing beam coordination for establishing relay links may enhance network and device efficiency.

SUMMARY

The described techniques relate to improved methods, systems, devices, and apparatuses that support establishment of a UE to UE relay link. In some cases, the techniques support establishment of a UE to UE relay link in millimeter wave carrier frequencies. Generally, the described techniques provide for a base station transmitting a relay link beam sweep configuration to a first UE for establishing a relay link with a second UE. Based on the relay link beam sweep configuration, the first UE may perform a relay link beam sweep procedure with the second UE using a plurality of beams. Based on the relay link beam sweep procedure, the first UE may select a first beam pair. The first UE may establish a relay link with the second UE using the selected beam pair.

A method of wireless communications by a first UE is described. The method may include receiving a relay link beam sweep configuration from a base station for establishing a relay link with a second UE, performing a relay link beam sweep procedure with the second UE using a set of beams based on the relay link beam sweep configuration, selecting a first beam pair based on the relay link beam sweep procedure, and establishing a relay link with the second UE using the first beam pair.

An apparatus for wireless communications by a first UE is described. The apparatus may include a processor, memory in electronic communication with the processor, and instructions stored in the memory. The instructions may be executable by the processor to cause the apparatus to receive a relay link beam sweep configuration from a base station for establishing a relay link with a second UE, perform a relay link beam sweep procedure with the second UE using a set of beams based on the relay link beam sweep configuration, select a first beam pair based on the relay link beam sweep procedure, and establish a relay link with the second UE using the first beam pair.

Another apparatus for wireless communications by a first UE is described. The apparatus may include means for receiving a relay link beam sweep configuration from a base station for establishing a relay link with a second UE, performing a relay link beam sweep procedure with the second UE using a set of beams based on the relay link beam sweep configuration, selecting a first beam pair based on the relay link beam sweep procedure, and establishing a relay link with the second UE using the first beam pair.

A non-transitory computer-readable medium storing code for wireless communications by a first UE is described. The code may include instructions executable by a processor to receive a relay link beam sweep configuration from a base station for establishing a relay link with a second UE, perform a relay link beam sweep procedure with the second UE using a set of beams based on the relay link beam sweep configuration, select a first beam pair based on the relay link beam sweep procedure, and establish a relay link with the second UE using the first beam pair.

In some examples of the method, apparatuses, and non-transitory computer-readable medium described herein, receiving the relay link beam sweep configuration may include operations, features, means, or instructions for receiving the relay link beam sweep configuration that indicates a transmit beam sweep opportunity parameter for the first UE, where the relay link beam sweep procedure may be performed within a first transmit beam sweep opportunity corresponding to the transmit beam sweep opportunity parameter.

In some examples of the method, apparatuses, and non-transitory computer-readable medium described herein, performing the relay link beam sweep procedure may include operations, features, means, or instructions for transmitting a reference signal using a first subset of a set of beams in the first transmit beam sweep opportunity and a second subset of the set of beams in a second transmit beam sweep opportunity corresponding to the transmit beam sweep opportunity parameter.

In some examples of the method, apparatuses, and non-transitory computer-readable medium described herein, receiving the relay link beam sweep configuration may include operations, features, means, or instructions for receiving the relay link beam sweep configuration that indicates a receive beam sweep opportunity for the first UE, where the relay link beam sweep procedure may be performed within a first receive beam sweep opportunity corresponding to the receive beam sweep opportunity parameter.

In some examples of the method, apparatuses, and non-transitory computer-readable medium described herein, performing the relay link beam sweep procedure may include operations, features, means, or instructions for monitoring for a reference signal transmitted by the second UE using a first subset of the set of beams in the first receive beam sweep opportunity and a second subset of the set of beams in a second receive beam sweep opportunity corresponding to the receive beam sweep opportunity parameter.

In some examples of the method, apparatuses, and non-transitory computer-readable medium described herein, establishing the relay link with the second UE may include operations, features, means, or instructions for transmitting a random access channel message to the second UE using a transmission beam of the first beam pair at the first UE, and receiving a random access channel response from the second UE using a receive beam of the first beam pair at the first UE.

In some examples of the method, apparatuses, and non-transitory computer-readable medium described herein, performing the relay link beam sweep procedure may include operations, features, means, or instructions for generating a measurement for each beam pair of a set of beam pairs based on cycling through the set of beam pairs.

Some examples of the method, apparatuses, and non-transitory computer-readable medium described herein may further include operations, features, means, or instructions for selecting the first beam pair based on the measurements.

Some examples of the method, apparatuses, and non-transitory computer-readable medium described herein may further include operations, features, means, or instructions for transmitting, to the base station, a measurement report including one or more of the measurements, where the relay link may be established based on receiving an instruction from the base station to establish the relay link using the first beam pair.

In some examples of the method, apparatuses, and non-transitory computer-readable medium described herein, performing the relay link beam sweep procedure may include operations, features, means, or instructions for transmitting or monitoring for a reference signal generated based on a synchronization signal sequence.

In some examples of the method, apparatuses, and non-transitory computer-readable medium described herein, performing the relay link beam sweep procedure may include operations, features, means, or instructions for receiving a reference signal, decoding a synchronization signal sequence from the reference signal, and determining a timing offset based on the synchronization signal sequence, where the relay link may be established based on the timing offset.

In some examples of the method, apparatuses, and non-transitory computer-readable medium described herein, establishing the relay link with the second UE may include operations, features, means, or instructions for transmitting a random access request to the second UE in a random access opportunity, and receiving a random access response from the second UE based on the random access request.

In some examples of the method, apparatuses, and non-transitory computer-readable medium described herein, establishing the relay link with the second UE may include operations, features, means, or instructions for receiving a random access request from the second UE in a first random access opportunity or a second random access opportunity that occurs after the first random access opportunity, and transmitting a random access response to the first UE based on the random access request.

Some examples of the method, apparatuses, and non-transitory computer-readable medium described herein may further include operations, features, means, or instructions for transmitting an identifier of the second UE, beam pair information of the first beam pair, or both, to the base station.

In some examples of the method, apparatuses, and non-transitory computer-readable medium described herein, receiving the relay link beam sweep configuration may include operations, features, means, or instructions for receiving the relay link beam sweep configuration that indicates a periodic resource in which to perform the relay link beam sweep procedure.

In some examples of the method, apparatuses, and non-transitory computer-readable medium described herein, the periodic resource may be a configured synchronization signal block resource or differs from the configured synchronization signal block resource.

In some examples of the method, apparatuses, and non-transitory computer-readable medium described herein, receiving the relay link beam sweep configuration may include operations, features, means, or instructions for receiving the relay link beam sweep configuration that indicates that a first set of UEs including the first UE to perform a transmit beam sweep procedure in a first instance of the periodic resource and a second set of UEs including the second UE to perform a receive beam sweep procedure in the first instance of the periodic resource.

In some examples of the method, apparatuses, and non-transitory computer-readable medium described herein, receiving the relay link beam sweep configuration may include operations, features, means, or instructions for receiving the relay link beam sweep configuration that indicates that a first set of UEs including the first UE to perform a receive beam sweep procedure in a first instance of the periodic resource and a second set of UEs including the second UE to perform a transmit beam sweep procedure in the first instance of the periodic resource.

Some examples of the method, apparatuses, and non-transitory computer-readable medium described herein may further include operations, features, means, or instructions for determining to perform the relay link beam sweep procedure based on at least one parameter.

In some examples of the method, apparatuses, and non-transitory computer-readable medium described herein, the at least one parameter may be one or more of a network identifier, a cell identifier, a radio network temporary identifier, a temporary mobile subscriber identity, a temporary identifier, or any combination thereof.

Some examples of the method, apparatuses, and non-transitory computer-readable medium described herein may further include operations, features, means, or instructions for detecting each beam pair of a set of beam pairs does not satisfy a threshold based on performing the relay link beam sweep procedure, and repeating the relay link beam sweep procedure to identify the first beam pair.

Some examples of the method, apparatuses, and non-transitory computer-readable medium described herein may further include operations, features, means, or instructions for waiting for a random backoff time period prior to repeat the relay link beam sweep procedure.

Some examples of the method, apparatuses, and non-transitory computer-readable medium described herein may further include operations, features, means, or instructions for transmitting data to the second UE via the relay link for forwarding to the base station.

Some examples of the method, apparatuses, and non-transitory computer-readable medium described herein may further include operations, features, means, or instructions for receiving data from the base station via the second UE and the relay link.

A method of wireless communications by a base station is described. The method may include transmitting a relay link beam sweep configuration to a first UE and a second UE and receiving an indication of a relay link established between the first UE and the second UE based on the relay link beam sweep configuration.

An apparatus for wireless communications by a base station is described. The apparatus may include a processor, memory in electronic communication with the processor, and instructions stored in the memory. The instructions may be executable by the processor to cause the apparatus to transmit a relay link beam sweep configuration to a first UE and a second UE and receive an indication of a relay link established between the first UE and the second UE based on the relay link beam sweep configuration.

Another apparatus for wireless communications by a base station is described. The apparatus may include means for transmitting a relay link beam sweep configuration to a first UE and a second UE and receiving an indication of a relay link established between the first UE and the second UE based on the relay link beam sweep configuration.

A non-transitory computer-readable medium storing code for wireless communications by a base station is described. The code may include instructions executable by a processor to transmit a relay link beam sweep configuration to a first UE and a second UE and receive an indication of a relay link established between the first UE and the second UE based on the relay link beam sweep configuration.

In some examples of the method, apparatuses, and non-transitory computer-readable medium described herein, transmitting the relay link beam sweep configuration may include operations, features, means, or instructions for transmitting the relay link beam sweep configuration that indicates a beam sweep opportunity parameter for indicating at least one opportunity to perform a relay link beam sweep procedure.

In some examples of the method, apparatuses, and non-transitory computer-readable medium described herein, transmitting the relay link beam sweep configuration may include operations, features, means, or instructions for transmitting the relay link beam sweep configuration that indicates a periodic resource in which to perform a relay link beam sweep procedure.

In some examples of the method, apparatuses, and non-transitory computer-readable medium described herein, the periodic resource may be a configured synchronization signal block resource or differs from the configured synchronization signal block resource.

In some examples of the method, apparatuses, and non-transitory computer-readable medium described herein, transmitting the relay link beam sweep configuration may include operations, features, means, or instructions for transmitting the relay link beam sweep configuration that indicates that a first set of UEs including the first UE to perform a transmit beam sweep procedure in a first instance of the periodic resource and a second set of UEs including the second UE to perform a receive beam sweep procedure in the first instance of the periodic resource.

In some examples of the method, apparatuses, and non-transitory computer-readable medium described herein, transmitting the relay link beam sweep configuration may include operations, features, means, or instructions for transmitting the relay link beam sweep configuration that indicates that a first set of UEs including the first UE to perform a receive beam sweep procedure in a first instance of the periodic resource and a second set of UEs including the second UE to perform a transmit beam sweep procedure in the first instance of the periodic resource.

In some examples of the method, apparatuses, and non-transitory computer-readable medium described herein, transmitting the relay link beam sweep configuration may include operations, features, means, or instructions for transmitting the relay link beam sweep configuration that indicates that a first plurality of UEs including the first UE is to perform a first of a transmit beam sweep procedure or a receive beam sweep procedure in a first instance of the periodic resource and a second plurality of UEs including the second UE is to perform a second of the transmit beam sweep procedure or the receive beam sweep procedure in the first instance of the periodic resource.

Some examples of the method, apparatuses, and non-transitory computer-readable medium described herein may further include operations, features, means, or instructions for receiving, from the first UE, the second UE, or both, a measurement report including one or more of beam pair measurements, and transmitting an instruction to the first UE, the second UE, or both to establish the relay link using a beam pair based on the measurement report.

Some examples of the method, apparatuses, and non-transitory computer-readable medium described herein may further include operations, features, means, or instructions for receiving an identifier of the first UE, the second UE, or both, beam pair information of a first beam pair used to establish the relay link, or both.

Some examples of the method, apparatuses, and non-transitory computer-readable medium described herein may further include operations, features, means, or instructions for receiving, from the second UE, data of the first UE that may have been received by the second UE via the relay link and forwarded to the base station.

Some examples of the method, apparatuses, and non-transitory computer-readable medium described herein may further include operations, features, means, or instructions for transmitting data to the second UE for forwarding to the first UE via the relay link.

DETAILED DESCRIPTION

Figure 1:
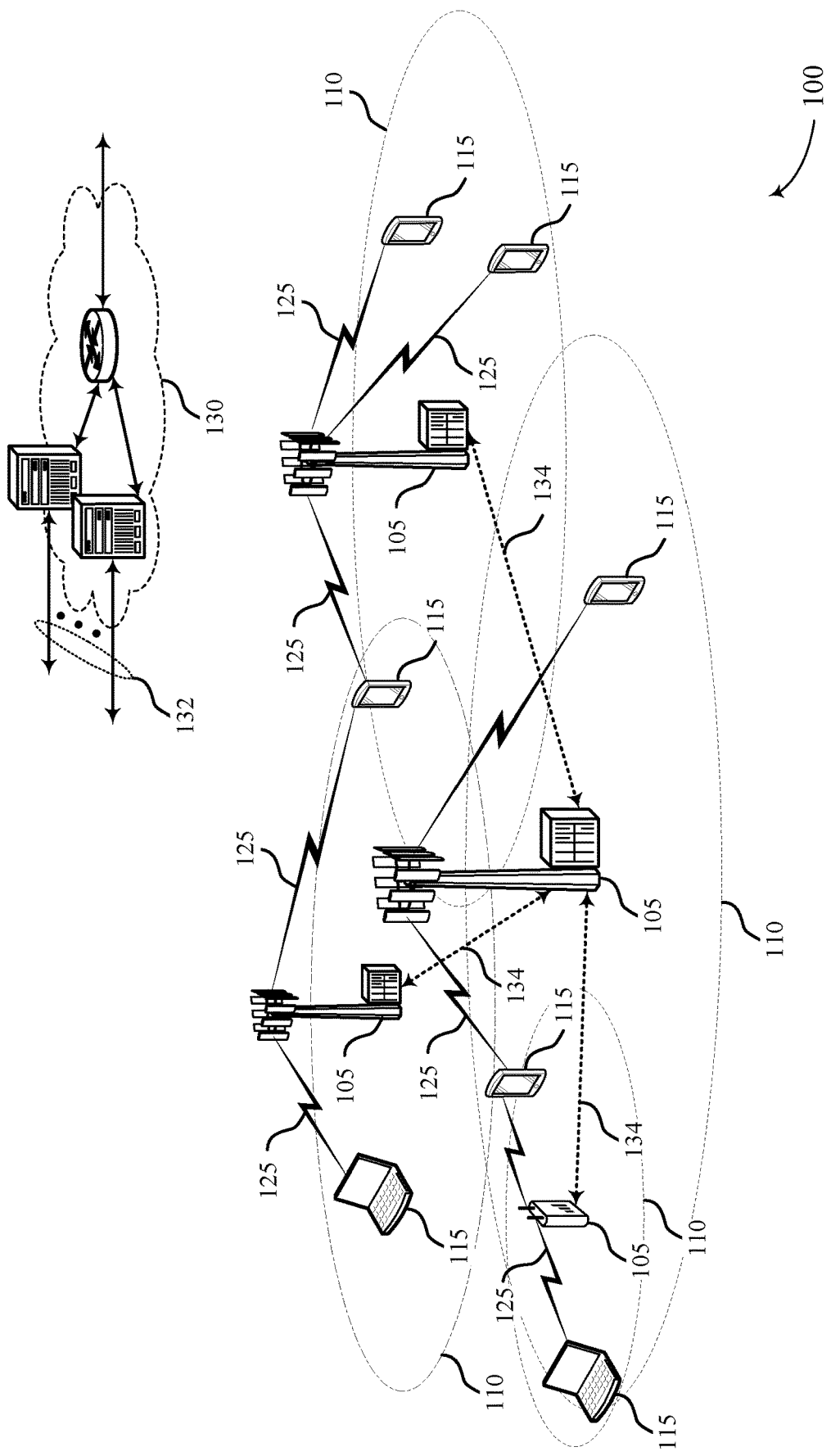
FIG. 1 illustrates an example of a system for wireless communications that supports establishment of a UE to UE relay link in accordance with aspects of the present disclosure.

Wireless communications systems may include UEs capable of communicating directly with other UEs. In some cases, a first UE may operate as a relay between a base station and a second UE. In a downlink scenario, the first UE may receive signals from the base station and forward or retransmit the received signal to the second UE. In an uplink scenario, the first UE may receive signals from the second UE and forward or retransmit the received signal to the base station. A relay link may be useful in some high density scenarios, such as dense areas (e.g., a high concentration of buildings or structures), populated areas such as stadiums, shopping malls, offices, downtown areas, etc., during special events, or in other scenarios or locale. In such cases, a blocker (e.g., a physical object that interferes with radio-frequency signals) may interfere with an established link between a base station and a UE. The UE and another UE may establish the relay link in response to the blocking object to continue communication with the base station. In some cases, relaying between UEs in a communication system may be referred to as network-assisted UE cooperation (NAUC) or network controlled interactive services (NCIS) for high density UE settings. While the blocker setting is an illustrative example of the need for setting up a relay link, relay link establishment is not expected to be restrictive to this example alone.

In some wireless communications systems, various devices (e.g., UEs and base stations) may implement beamforming for improved signal transmission and reception quality. UEs in a relay scenario may further utilize beamforming techniques for improved signal transmission and reception quality. A base station may control one or more aspects of beam coordination between UEs for establishing a relay link. In some cases, a base station transmits a beam sweep configuration to one or more UEs for establishing a relay link between UEs. The beam sweep configuration may indicate a transmit beam sweep opportunity to one or more UEs, a receive beam sweep opportunity to one or more UEs, a periodic resource (and its identifier) for performing the relay beam sweep procedure, etc.

Based on the beam sweep configuration, the UEs may perform a relay link beam sweep procedure to identify beam pairs (e.g., receive and transmit beams between two UEs) for establishing a relay link. The relay beam sweep procedure may include transmission of and/or monitoring for reference signals based on the beam sweep configuration. In some cases, a UE may cycle through a set of beam pairs and generate a measurement report for each beam pair. Based on the measurement, the UE may select the beam pair for establishing the relay link. In some cases, performing the relay beam sweep procedure may include receiving a reference signal and decoding a synchronization signal sequence from the reference signal. Based on the synchronization signal sequence, the UE may determine a timing offset. In such cases, the relay link may be established based at least in part on the timing offset. When beam pairs are identified by the one or more UEs, the one or more UEs may indicate the identified beam pairs to the base station and conduct a random access procedure to establish the relay link. Using the established relay link, one of the UEs may communicate with the base station via the other UE.

Particular aspects of the subject matter described herein may be implemented to realize one or more advantages. The described techniques may support improvements in the communicating in a relay link framework, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are further described in the context of another wireless communications system, a relay link procedure diagram, and a process flow diagram. Aspects of the disclosure are further illustrated by and described with reference to apparatus diagrams, system diagrams, and flowcharts that relate to establishment of a UE to UE relay link.

FIG. 1 illustrates an example of a wireless communications system 100 that supports establishment of a UE to UE relay link in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, one or more UEs 115 may establish relay links to communicate with a base station 105 based on a signal blocking condition. For example, a communication link 125 between a first UE 115 and a base station 105 may be impeded or interfered with by a blocking object (e.g., a physical object that interferes with a radio-frequency (RF) communication signal). To remedy the affected link, the first UE 115 may autonomously or semi-autonomously establish a relay link with a second UE, such that the second UE 115 may communicate signals between the first UE 115 and the base station 105.

Because the UEs 115 may be configured to communicate using beamforming techniques and in high frequencies (e.g., mmW), the base station 105 may enable the UEs 115 to establish beamformed relay link to maintain the high throughput and signal quality of the high frequency transmissions. To enable the first UE 115 and the second UE 115 to establish the relay link, the base station 105 may configure the UEs 115 using a relay link beam sweep configuration. The relay link beam sweep configuration may provide a relay link discovery opportunity for a plurality of UEs 115 in a cell of the respective base station 105. In some cases, the relay link beam sweep configuration may indicate beam sweep opportunities (e.g., periodic resources) to a UE 115 or sets of UEs 115 in the cell to perform a relay link beam sweep procedure. In some cases, the indicated opportunities or periodic resources indicated may be based on the capabilities of the UE 115. The UEs 115 in a cell may conduct the relay link beam sweep procedure to identify relay link beam pairs between respective UEs 115. Using the identified beam pairs, a UE 115 may establish the relay link (e.g., using a random access procedure) and communicate with a base station 105 using the established relay link. The relay link techniques described herein may be implemented in various types of UEs 115, such as repeater devices or repeaters, UEs configured with repeater functionality, routers, smart nodes, etc.

Figure 2:
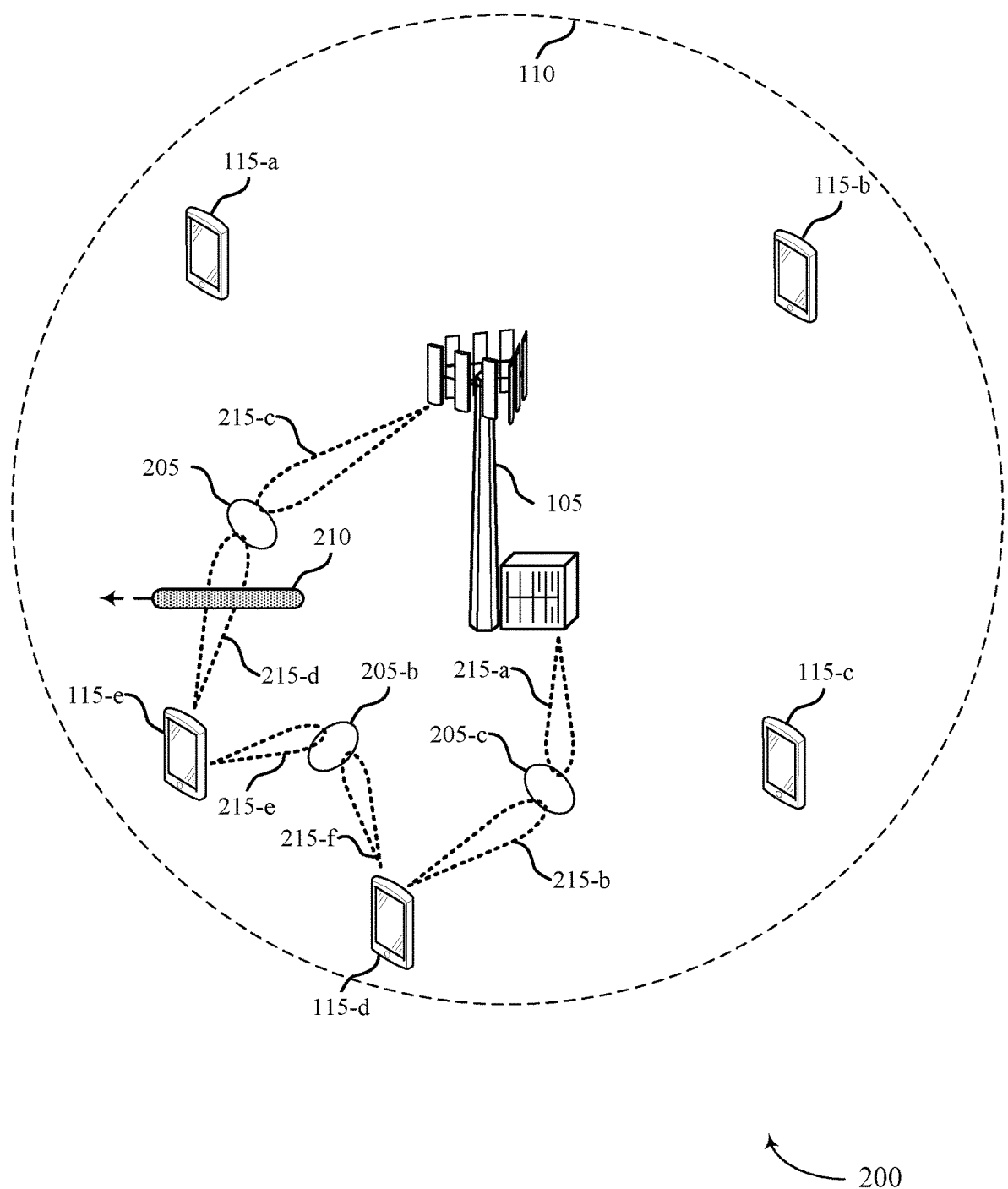
FIG. 2 illustrates another example of a wireless communications system that supports establishment of a UE to UE relay link in accordance with aspects of the present disclosure.

FIG. 2 illustrates another example of a wireless communications system 200 that supports establishment of a UE to UE relay link in accordance with aspects of the present disclosure. In some examples, wireless communications system 200 may implement aspects of wireless communications system 100. The wireless communications system 200 illustrates an example scenario in which a relay link may be established. The wireless communications system 200 includes various UEs 115, a base station 105, and clusters 205. Base station 105 may establish one or more beamformed links with the UEs 115 using various transmit/receive beams 215. In some cases, the base station 105 may establish a beamformed link with a UE via a cluster 205 in a channel. The cluster 205 may be an example of a reflecting object, such as a glass window, lamp post, metal object, or any other object that reflects or deflects energy. For example, the base station 105 establishes a beamformed link with UE 115-d using beam 215-a, cluster 205-c, and beam 215-b. The base station 105 may also establish a beamformed link with UE 115-e using beam 215-c, cluster 205-a, and beam 215-d.

In some cases, a blocker 210 may impede or interfere with a beamformed link. As illustrated in FIG. 2, blocker 210 interferes with beam 215-d, which may cause a loss in signal or a drop in signal quality at the beamformed link between base station 105 and UE 115-e. The blocker 210 may be an example of a physical blocker such as a person (e.g., a person's hand or body), a vehicle, building, foliage, etc., which interferes with a signal. In some cases, to reestablish a link between the base station 105 and the UE 115-e due to blocker 210, the devices (e.g., the UE 115-e and the base station 105) may change a beam configuration such as to transmit in a different direction (e.g., using a different cluster 205) to establish a different or second link. However, in some cases, it may be difficult for the UE 115-e and the base station 105 to establish a new link based on various reasons, such as a cluster 205 not being available, a UE 115 in a mobile scenario, etc. In such cases, the UE 115-e may attempt to establish a link with another UE 115-d. When the base station 105 and the UE 115-e are operating in a mmW scenario, the UE 115-e may attempt to establish a link with another UE 115 using a D2D protocol. However, in such cases, the UEs 115 may sacrifice operating power and signal quality to establish such links, because the UEs may drop or not utilize available capabilities (e.g., the devices may utilize one of many available antennas). Accordingly, the implementations described herein may be utilized to establish relay links between UEs 115 while maintaining device capability (e.g., mmW and/or beamforming), which may result in enhanced signal throughput relative to other relay techniques.

The techniques described herein may provide for an autonomous or semi-autonomous establishment of a relay link to UEs 115. In some cases, the UEs may establish the relay link in response to a blocker (e.g., blocker 210) interfering with an established channel between UE 115-e and base station 105, or the link may fade due to Doppler. Accordingly, the UE 115-e may set up a link with UE 115-d to assist with beam failure recovery (or other purposes). For example, the relay link may also be utilized such that UEs 115 can cooperate in communications with a base station, such that UEs 115 can assist other UEs 115 in the network (e.g., CV2X where no gNB is close by), and such that a base station 105 can cooperate and communicate information via multiple UEs 115 to a UE 115.

To enable UEs 115 to establish a relay link, a gNB (e.g., base station 105) may intervene or coordinate the UEs 115 in a geographic coverage area 110. First, a gNB may determine which UEs 115 can be coordinated as a relay link. Next, the gNB may inform both UEs 115 which RS/random access channel (RACH) resources to use for the relay link. The gNB may then relay beam/timing information if available. Finally, the UEs 115 may utilize the RS/RACH resources and beam/timing information (if available) to set up a relay link. However, this approach may require a central entity in the form of a gNB to set up the relay link. In some cases, a gNB may be too far away to perform the coordination (e.g., when UEs are vehicular, UEs are under deep fade, etc.). A link between a UE and gNB may be broken before a relay link between that UE and a different UE has been established (e.g., abrupt link failures due to fade, blockage, etc. which can happen on the order of a few 10s of ms). Accordingly, the implementations described herein enable UEs to establish relay links autonomously or semi-autonomously. Example tradeoffs associated with autonomous or semi-autonomous relay link establishment may exist. In some cases, constant beam sweeping incurs overhead (e.g., power consumption) at the expensive of not needing a gNB to perform "hands on" coordination. Further, there may be a tradeoff between limited/minimal gNB intervention to maximum gNB intervention in relay link establishment.

To set up a relay link. the network/gNB (e.g., base station 105) may configure Tx beam sweeping opportunities for a first subset of UEs in a cell (e.g., coverage area 110) using a parameter Trelay-beamsweep-tx-first-set-rx-second-set. For example, the base station 105 may configure Tx beam sweeping opportunities for a first subset of UEs 115 including UEs 115-a and 115-e. The gNB may configure Rx beam sweeping opportunities at the same time instance for other UEs 115 (second set of UEs) in the cell. For example, the base station 105 may configure Rx beam sweeping opportunities for a second set of UEs 115 including UE 115-b, UE 115-c, and UE 115-d. Classification of UEs into the first and second subsets can be configured by the network/gNB or by randomization of UEs themselves (e.g., based on their network ID or time index corresponding to Tx/Rx). A RACH opportunity corresponding to the Tx-Rx opportunities may be allocated from the second set to the first set denoted by Trach-second-set-to-first-set. gNB can also configure Rx beam sweeping opportunities for the first set and Tx beam sweeping opportunities for the second set with a parameter Trelay-beamsweep-tx-second-set-rx-first-set and RACH opportunities for the first set to the second set with Trach-first-set-to-second-set. Further, the base station 105 may configure multiple set partitions of the UEs 115 in the cell. The configured beam sweeping opportunities may allow a number of beam pairs to be scanned at both ends.

The UEs 115 in the first set may then perform a Tx beam sweep, and the UEs 115 in the second set may perform an Rx beam sweep at Trelay-beamsweep-tx-first-set-rx-second-set. Similarly, the UEs in the first set may perform a Rx beam sweep at Trelay-beamsweep-tx-second-set-rx-first-set, and the second set may perform a Tx beam sweep. In some cases, if all beam pairs are not scanned within one beam sweeping opportunity, this process may be repeated over subsequent opportunities. In some cases, a Tx set may use specifically designed PSS/SSS sequences or legacy solutions.

Assuming that the signal from a first UE 115 in the first set is received by a second UE 115 in the second set for at least one beam pair without collision from other transmissions (or with a sufficient reference signal received power (RSRP)), the second UE may determine a timing offset from PSS/SSS decoding. A pair of UEs 115 may establish a relay link using multiple techniques. In some cases, the pair of UEs 115 establish the relay link themselves. For example, the second UE 115 from the second set may use a RACH opportunity Trach-second-set-to-first-set to transmit a request for a relay link establishment procedure to the first UE in the first set. In another example, the second UE from the second set may document a record of the first UE 115 from the first set and then establish a relay link using a future RACH opportunity (at N*Trach-second-set-to-first-set where N>1 assuming time of the process starts at t=0) as needed by the second UE 115. In other cases, the UEs 115 may report discovery measurements to the network/gNB (e.g., base station 105), which may then determine whether and how to establish a relay link between the UEs 115. In such cases, the network allows autonomous discovery, but may retain control over link establishment.

If the signal from a first UE in the first set is not received by any UE in the second set, this may be due to collision of simultaneous transmissions, due to poor RSRP for the beam pairs, or the like. In the case of collisions, the first UE in the first set may perform a random backoff over beam sweeping opportunities and perform a beam sweeping at the backed off instance/opportunity (denoted as M*Trelay-beamsweep-tx-first-set-rx-second-set for some M>1). In the case of poor RSRPs, the first UE in the first set may use a refined beam for beam sweeping and attempt to establish a relay link again.

In some cases, the gNB may configure the beam sweeping opportunities for the UEs 115 within the cell to enable relay link identification using different techniques. In one case, the configuration of the beam seeping opportunity corresponds to transmission, by the base station 105, of an identification of a periodic resource for beam sweeping. In some cases, the periodic resource may be the same or different from existing uplink and/or downlink synchronization signal block (SSB) resources at the UE 115. In some cases, a gNB may configure a first set of UEs 115 for transmit beam sweeping and a second set of UEs for receive beam sweeping over a first periodic resource along with appropriate RACH resources. In other cases, the gNB may configure the second set of UEs 115 for transmit beam sweeping and the first set of UEs 115 for receive beam sweeping over a second periodic resource along with appropriate RACH resources. In some examples, a gNB configures different sets of periodic resources for different sets of UEs within a cell. In other examples, UEs 115 may self-assign themselves in one of the first set or the second set based on UE parameters such as a cell identifier, C-RNTI, S-TMSI, or a temporary identifier used in next update (TIN). Accordingly, based on the self-assignment, the UEs 115 may Tx beam sweep or Rx beam sweep in one or more different periodic resources to identify beam pairs.

Based on the assignment or configuration, UEs 115 in the first set may perform transmit beam sweeping, and UEs 115 in the second set may perform receive beam sweeping over the first periodic resource. Further, the UEs 115 in the first set may perform receive beam sweeping, and the UEs in the second set may perform transmit beam sweeping over the second periodic resource. In some cases, multiple resources may be used for beam sweeping if each beam sweeping opportunity allows scanning on a first number of beam pairs, but not on a second number of beam pairs (e.g., based on the number of resources and the number of beam pairs). UEs in the first set may use a specifically designed PSS/SSS sequence for transmit beam sweeping over the first periodic resource, and the UEs 115 in the second set may use the same or a different specifically designed PSS/SSS sequence for transmit beam sweeping over the second periodic resource. In some cases, a second UE 115 in the second set may use the immediate or a future RACH resource opportunity associated with the first periodic beam sweeping resource to convey the request (e.g., transmit a random access request) for a relay link establishment procedure to a first UE 115 in the first set if the received signal from the first UE 115 to the second UE 115 exceeds a threshold. Similarly, a first UE 115 in the first set may use the immediate or a future RACH resource opportunity associated with the second periodic beam sweeping resource to convey the request for a relay link establishment procedure to a second UE 115 in the second set if the received signal from the second UE 115 to the first UE 115 exceeds a threshold.

In some cases, a UE 115 may convey discovered measurements such as discovered UE ID, beam information, etc. to the gNB (e.g., base station 105) to assist with relay link establishment. In some examples, a UE 115 of the first set may repeat the beam sweeping with refined beams if no beam pair from any UE 115 in the second set triggers a relay link establishment procedure. In some examples, a first UE 115 may perform a random backoff and attempt beam sweeping at a different instance of the first periodic resource for relay link establishment. Similarly, a second UE 115 may perform a random backoff and attempt beam sweeping at a different instance of the second periodic resource or relay link establishment.

As illustrated in FIG. 2, blocker 210 affects the link between UE 115-e and base station 105. In response, the UE 115-e establishes a relay link with UE 115-d. The established relay link includes beam 215-e, cluster 205-b, and beam 215-f. The beams 215-e and 215-f may be identified using the techniques described herein.

Figure 3:
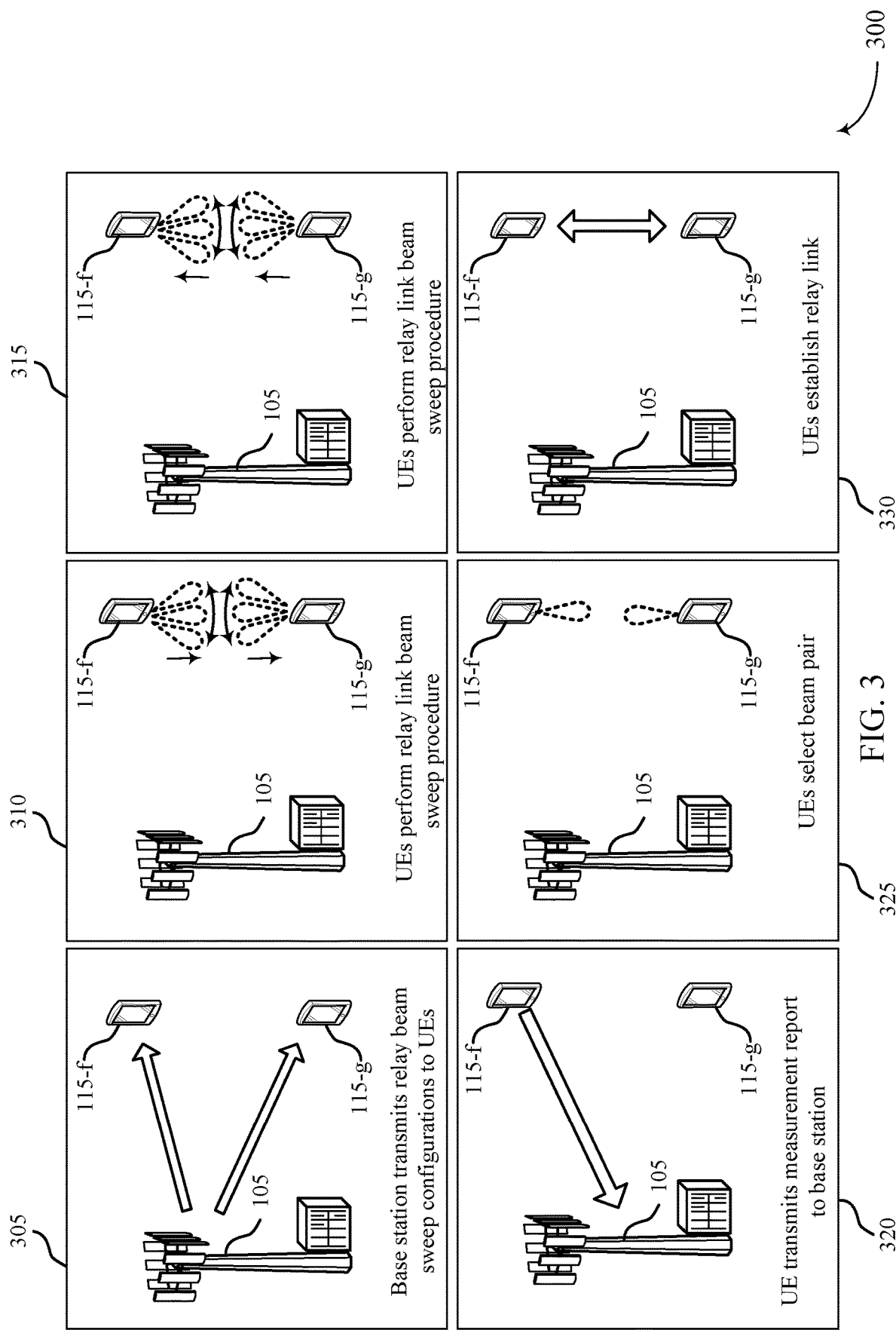
FIG. 3 illustrates an example of a rely link procedure diagram that supports establishment of a UE to UE relay link in accordance with aspects of the present disclosure.

FIG. 3 illustrates an example of a relay link procedure diagram 300 that supports establishment of a UE to UE relay link in accordance with aspects of the present disclosure. In some examples, devices of the relay link procedure diagram 300 may implement aspects of wireless communications system 100 and 200. The relay link procedure diagram 300 includes base station 105 and UEs 115-f and 115-g.

At 305, base station 105 transmits a relay link beam sweep configuration to UEs 115. In some cases, the base station 105 transmits a relay link beam sweep configuration to all UEs within a cell or coverage area. In some examples, the base station 105 transmits different corresponding beam configurations to different sets of UEs. For example, the beam sweep configuration may indicate that a first plurality of UEs including a first UE (e.g., UE 115-f) to perform a transmit beam sweep procedure in a first instance of a periodic resource and a second plurality of UEs including a second UE (e.g., UE 115-g) to perform a receive beam sweep procedure in the first instance of the periodic resource. In such cases, the beam sweep configuration may further indicate that the first plurality of UEs is to perform a receive beam sweep procedure in a second instance of the periodic resource and the second plurality of UEs is to perform a transmit beam sweep procedure in the second instance of the periodic resource. In some cases, the configuration indicates a sweep opportunity parameter indicating at least one opportunity to perform a relay link beam sweep procedure (e.g., transmit beam sweep opportunity and/or receive beam sweep opportunity) for each of the respective sets of UEs 115.

At 310, the UEs 115 perform a relay link beam sweep procedure according to the relay link beam sweep configuration. Some the operations of 310 may be performed during a first beam sweep opportunity or during a first instance of a periodic resource based on the relay link beam configuration. The UE 115-f may transmit a reference signal using a first subset of a plurality of beams in the first transmission opportunity and using a second subset of the plurality of beams in a second transmit beam sweep opportunity based on a received beam sweep opportunity parameter. The UE 115-g may monitor for the reference signal transmitted by the UE 115-f using a first subset of the plurality of beams in the first receive beam sweep opportunity and a second subset of the plurality of beams in a second receive beam sweep opportunity corresponding to a received receive beam sweep opportunity parameter received at 305. The receive beams and/or transmit beams used to transmit a reference signal and/or to monitor for the reference signal may be based on a codebook indicated to the UEs 115 by the base station 105 or pre-configured at the UEs 115.

At 315, the UEs 115 perform the relay link beam sweep procedure according to the relay link beam sweep configuration. Some of the operations of 315 may be performed during a second beam sweep opportunity or during a second instance of a periodic resource based on the relay link beam configuration (e.g., after the operations at 310). The UE 115-g may transmit a reference signal using a first subset of a plurality of beams in a second transmission opportunity and using a second subset of the plurality of beams in a second transmit beam sweep opportunity based on a received beam sweep opportunity parameter. The UE 115-f may monitor for the reference signal transmitted by the UE 115-g using a first subset of the plurality of beams in the receive beam sweep opportunity and a second subset of the plurality of beams in a second receive beam sweep opportunity corresponding to a receive beam sweep opportunity parameter received at 305. The receive beams and/or transmit beams used to transmit a reference signal and/or to monitor for the reference signal may be based on a codebook indicated to the UEs 115 by the base station 105 or pre-configured at the UEs 115.

At 320, a UE (e.g., UE 115-f) generates one or more measurements. The measurements may be generated during the beam sweep procedures at 305 and 310. The receiving UE (e.g., UE 115-g in 310 and UE 115-f in 315) may generate a measurement for each beam pair based cycling through the beam pairs during beam sweep procedure. In some case, the measurements include a received signal power. The UE 115-f may transmit a measurement report to the base station 105. The measurement report may include a UE identifier for UE 115-g, a received power measurement, selected beam configuration indication, or some other information.

At 325, the UEs 115 select a beam pair for establishing a relay link. For example, if the received signal power is above a threshold, then the beams corresponding to the signal power above the threshold may be selected as a beam pair for establishing a relay link. Using the selected beam pair, the receiving UE may determine a timing offset from a PSS/SSS decoding.

At 330, the UEs 115-f and 115-g establish a relay link. To establish a relay link, a UE 115 may transmit a random access request to the other UE using an appropriate opportunity corresponding to the selected beams. The other UE may transmit a random access response to the first UE using the selected receive beam. In some cases, the random access opportunity may be documented or saved and used at a subsequent time to transmit the random access request to establish the relay link. In some cases, the base station 105 may determine whether and how to establish a relay link based on received measurement reports.

Figure 4:
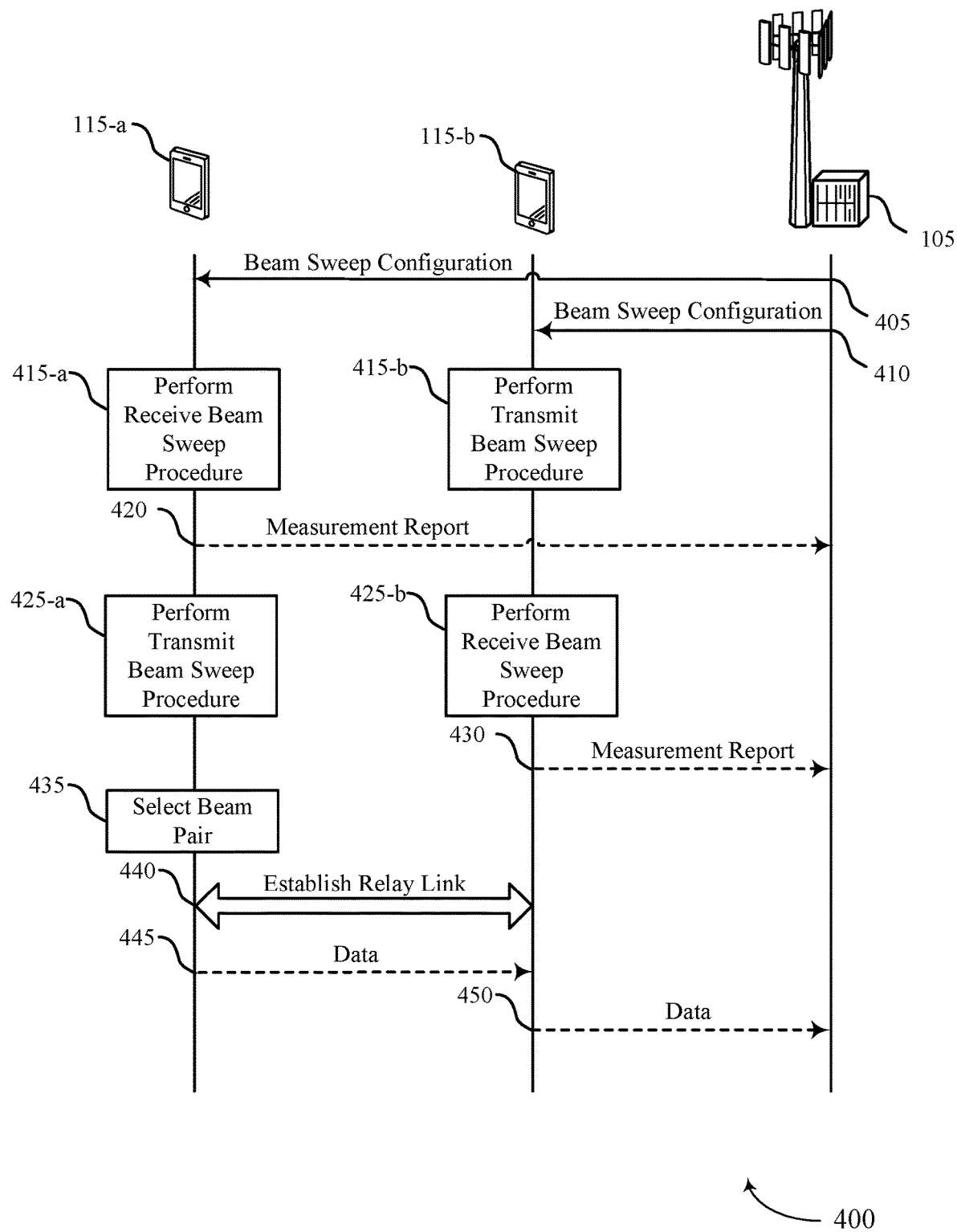
FIG. 4 illustrates an example of a process flow diagram that supports establishment of a UE to UE relay link in accordance with aspects of the present disclosure.

FIG. 4 illustrates an example of a process flow diagram 400 that supports establishment of a UE to UE relay link in accordance with aspects of the present disclosure. In some examples, devices of the process flow diagram 400 may implement aspects of wireless communications system 100. The process flow diagram 400 includes UE 115-a, UE 115-b, and base station 105.

At 405, base station 105 transmits a relay link beam sweep configuration to UE 115-a, and at 410, the base station 105 transmits a relay link beam sweep configuration to UE 115-b. It should be understood that the operations at 405 and 410 may be performed simultaneously or contemporaneously. In some cases, the base station 105 broadcasts a relay link beam sweep configuration to UEs 115 in a cell. In some cases, the UE 115-a is a first UE of a first plurality of UEs in that receive a first relay link beam sweep configuration, and the UE 115-b is a second UE of a second plurality of UEs that receive a second relay link beam sweep configuration. The assignment of the UEs 115-a and 115-b to respective sets may be based on various criteria, such as network or cell identifier or time of Tx/Rx. The configurations may indicate transmit beam sweep opportunity parameters or indicate to perform a transmission or reception beam sweep procedure in instances of a periodic interval.

At 415, the UEs 115-a and 115-b perform a relay link beam sweep procedure using a plurality of beams based at least in part on the relay link beam sweep configuration. In some cases, the UE 115-a may, at 415-a, perform a receive beam sweep procedure in which the UE 115-a monitors for a reference signal transmitted by the UE 115-b during a beam sweep opportunity (or periodic resource) indicated by the configuration. Contemporaneously, the UE 115-b may, at 415-b, transmit a reference signal using a subset of transmit beams during the transmit beam sweep opportunity (or periodic resource).

At 420, the UE 115-a may transmit a measurement report to the base station 105. The measurement report may indicate received power measurements, UE identifiers, beam configurations, etc.

At 425, the UEs 115-a and 115-b perform a relay link beam sweep procedure using a plurality of beams based at least in part on the relay link beam sweep configuration. The operations at 425 may be considered the same beam sweep procedure as discussed at 415. In some cases, the UE 115-b may, at 425-b, perform a receive beam sweep procedure in which the UE 115-b monitors for a reference signal transmitted by the UE 115-a during a beam sweep opportunity (or periodic resource) indicated by the configuration. Contemporaneously, the UE 115-a may, at 425-a, transmit a reference signal using a subset of transmit beams during the transmit beam sweep opportunity (or periodic resource).

At 430, the UE 115-*b* may transmit a measurement report to the base station 105. The measurement report may indicate received power measurements, UE identifiers, beam configurations, etc.

At 435, the UE 115-*a* selects a beam pair for establishing a relay link. The beam pair may be selected based on a received signal power (e.g., from a reference signal received at 415-*a*) relative to a threshold. In other cases, the selected beam pair may be indicated by the base station based on the received measurement reports.

At 440, the UE 115-*a* and 115-*b* may establish a relay link. The relay link may be established using a random access procedure. For example, the UE 115-*a* may determine a timing offset from PSS/SSS decoding corresponding to the selected beam. The UE 115-*a* may then transmit a random access request during a random access opportunity corresponding to the selected beam pair. The UE 115-*b* may receive a random access response to establish the relay link.

At 445, the UE 115-*a* transmits data to the UE 115-*b* using the established relay link over the selected beam pair. At 450, the UE 115-*b* transmits the data to the base station 105.

Figure 5:
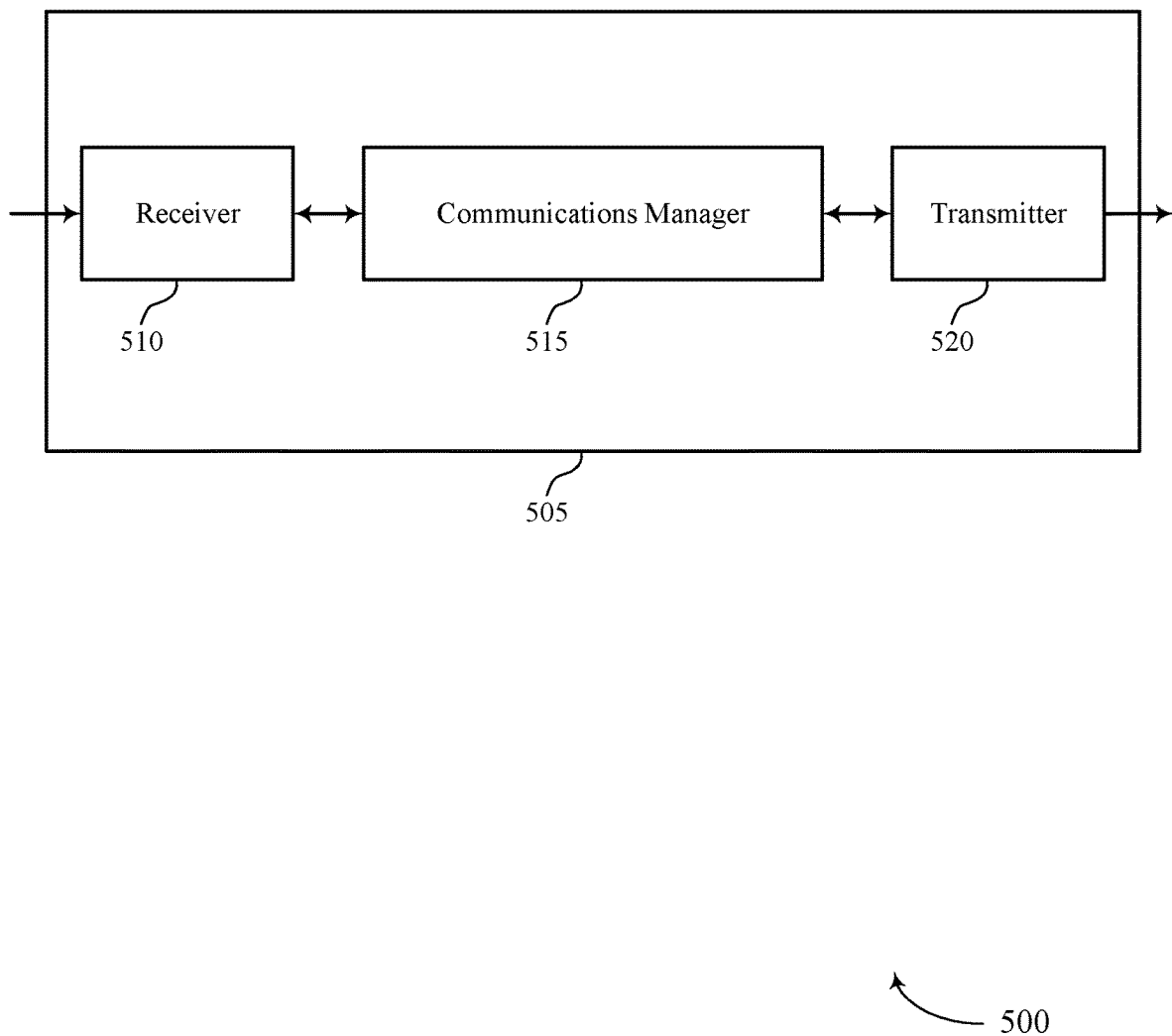
FIGS. 5 and 6 show block diagrams of devices that support establishment of a UE to UE relay link in accordance with aspects of the present disclosure.

FIG. 5 shows a block diagram 500 of a device 505 that supports establishment of a UE to UE relay link in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to establishment of a UE to UE relay link, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a relay link beam sweep configuration from a base station for establishing a relay link with a second UE, perform a relay link beam sweep procedure with the second UE using a set of beams based on the relay link beam sweep configuration, select a first beam pair based on the relay link beam sweep procedure, and establish a relay link with the second UE using the first beam pair. The communications manager 515 may be an example of aspects of the communications manager 810 described herein.

One implementation may include receiving a relay link beam sweep configuration from a base station for establishing a relay link with a second UE, performing a relay link beam sweep procedure with the second UE using a set of beams based on the relay link beam sweep configuration, selecting a first beam pair based on the relay link beam sweep procedure, and establishing a relay link with the second UE using the first beam pair. This implementation may be used to provide advantages over alterative implementations, in which a UE may waste resources continuously beam scanning until a potential link is identified. The implementation described herein may increase efficiency of a device. For example, based on the indicated relay link beam sweep configuration, the UE may identify a beam pair for establishing a relay link during a scheduled beam sweep opportunity rather than continuously scanning. Further, because the UE may establish a relay link using a beamformed signal using the described implementation, the UE may maintain high signal throughput provided by beamformed signals (e.g., in a high frequency communication environments such as mmW) in the relay link.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Based on the beam selection relay link beam sweep configuration, a processor of a UE 115 (e.g., controlling the receiver 510, the transmitter 520, or the transceiver 820 as described with reference to FIG. 8) may identify resources for establishing a relay link (e.g., beam pairs for communicating with another UE). Accordingly, based on the relay link beam sweep configuration, the UE 115 may turn on one or more processing units for performing the relay link beam sweep procedure, increase a processing clock, or a similar mechanism within the UE 115. As such, when the procedure is performed, the processor may be ready to efficiently identify beam pairs for establishing the relay link.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently coordinate relay link establishment, and more specifically to autonomously or semi-autonomously establish relay link with another device and using mmW/beamformed techniques. For example, the device 505 may receive a relay link beam sweep configuration from a base station and perform a beam sweep procedure to identify a beam configuration to use in the relay link.

Based on implementing the relay link techniques as described herein, a processor of a UE 115 (e.g., controlling the receiver 510, the transmitter 520, or the transceiver 820 as described with reference to FIG. 8) may increase reliability and decrease signaling overhead in the communication of feedback because the feedback configuration may not be explicitly indicated to the UE 115.

Figure 6:
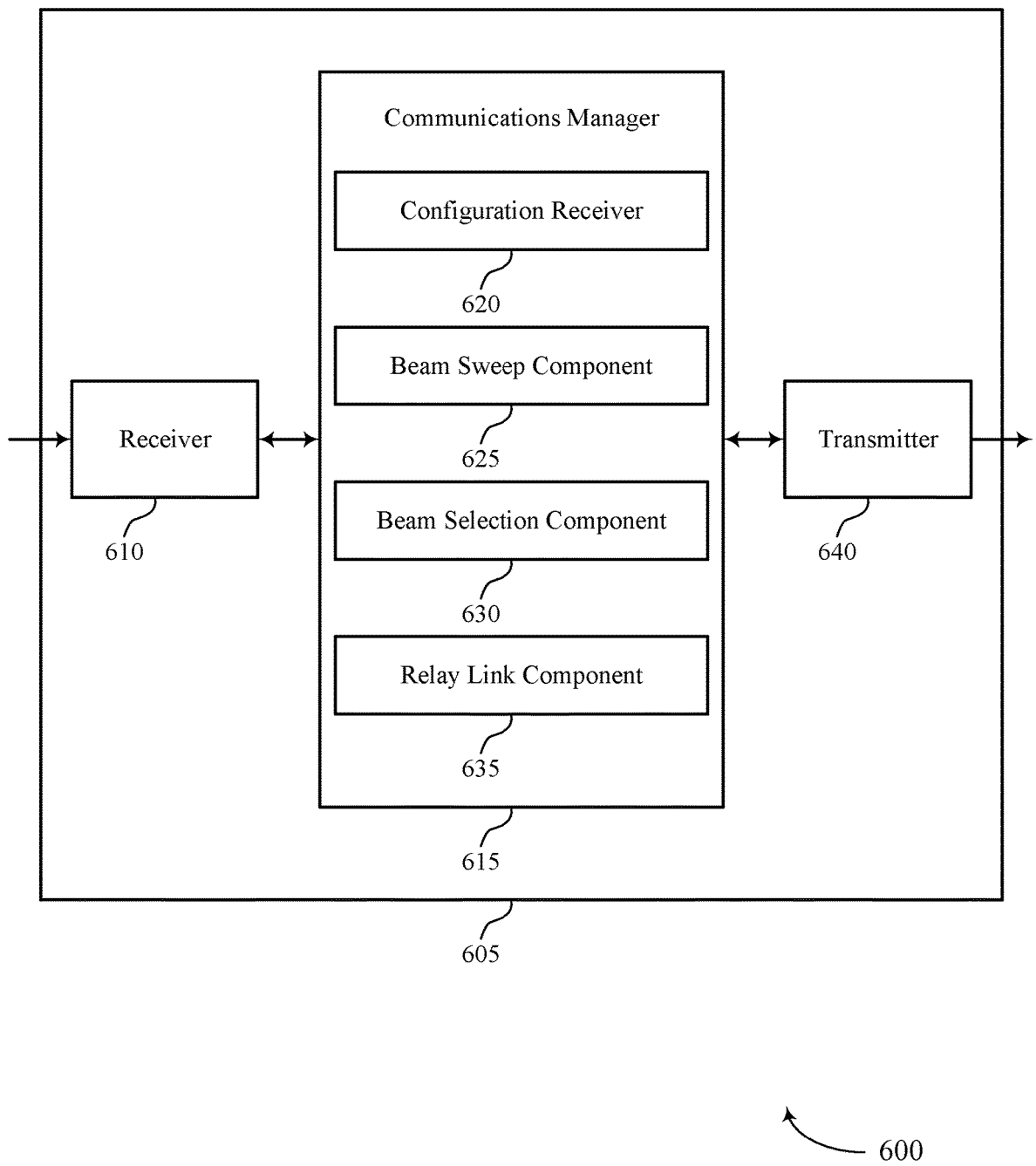

FIG. 6 shows a block diagram 600 of a device 605 that supports establishment of a UE to UE relay link in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to establishment of a UE to UE relay link, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration receiver 620, a beam sweep component 625, a beam selection component 630, and a relay link component 635. The communications manager 615 may be an example of aspects of the communications manager 810 described herein.

The configuration receiver 620 may receive a relay link beam sweep configuration from a base station for establishing a relay link with a second UE.

The beam sweep component 625 may perform a relay link beam sweep procedure with the second UE using a set of beams based on the relay link beam sweep configuration. The beam selection component 630 may select a first beam pair based on the relay link beam sweep procedure.

The relay link component 635 may establish a relay link with the second UE using the first beam pair.

The transmitter 640 may transmit signals generated by other components of the device 605. In some examples, the transmitter 640 may be collocated with a receiver 610 in a transceiver component. For example, the transmitter 640 may be an example of aspects of the transceiver 820 described with reference to FIG. 8. The transmitter 640 may utilize a single antenna or a set of antennas.

Figure 7:
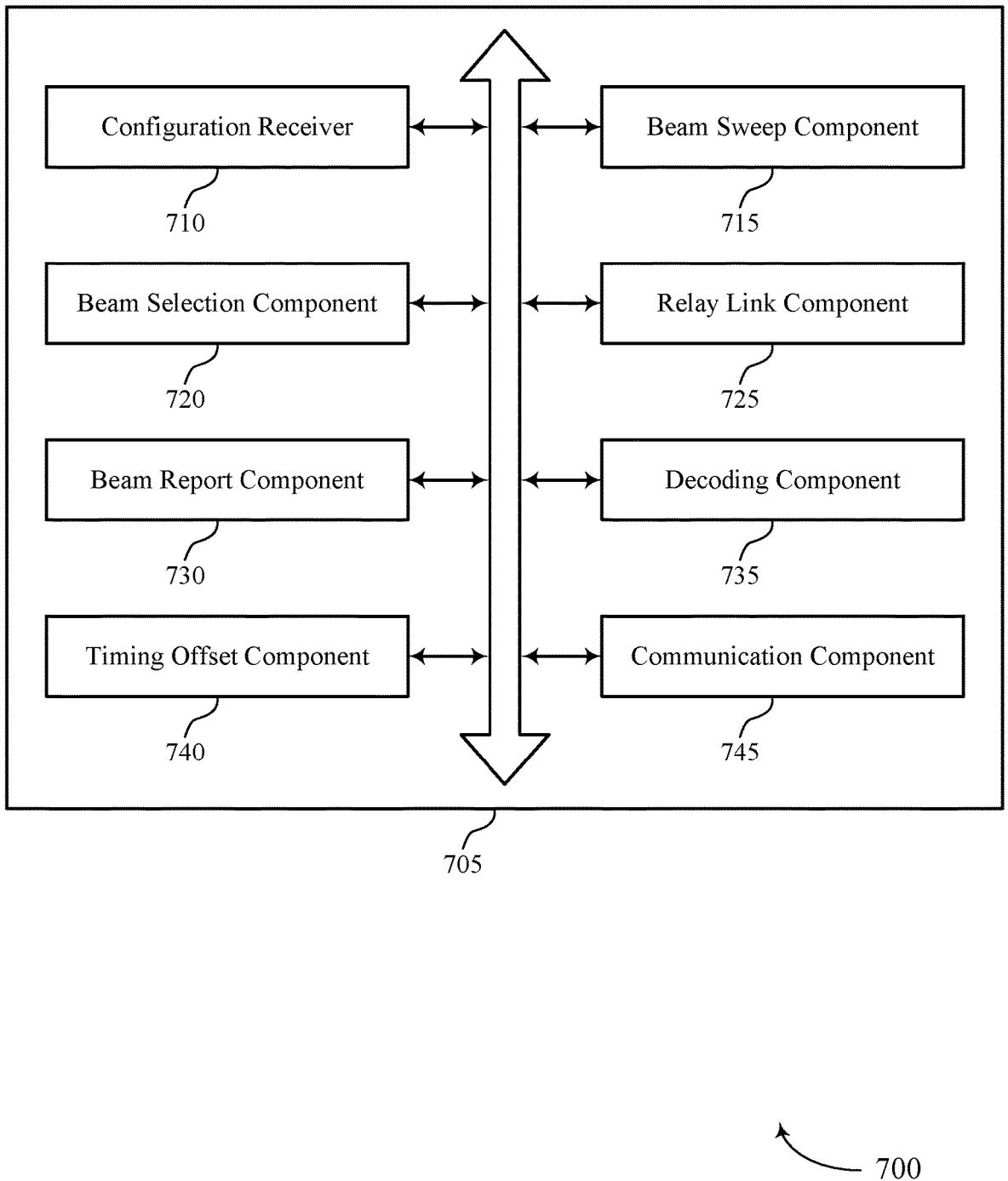
FIG. 7 shows a block diagram of a communications manager that supports establishment of a UE to UE relay link in accordance with aspects of the present disclosure.

FIG. 7 shows a block diagram 700 of a communications manager 705 that supports establishment of a UE to UE relay link in accordance with aspects of the present disclosure. The communications manager 705 may be an example of aspects of a communications manager 515, a communications manager 615, or a communications manager 810 described herein. The communications manager 705 may include a configuration receiver 710, a beam sweep component 715, a beam selection component 720, a relay link component 725, a beam report component 730, a decoding component 735, a timing offset component 740, and a communication component 745. Each of these components may communicate, directly or indirectly, with one another (e.g., via one or more buses).

The configuration receiver 710 may receive a relay link beam sweep configuration from a base station for establishing a relay link with a second UE. In some examples, the configuration receiver 710 may receive the relay link beam sweep configuration that indicates a transmit beam sweep opportunity parameter for the first UE, where the relay link beam sweep procedure is performed within a first transmit beam sweep opportunity corresponding to the transmit beam sweep opportunity parameter.

One example advantage of receiving the relay link beam sweep configuration that indicates a transmit beam sweep opportunity parameter for the first UE, wherein the relay link beam sweep procedure is performed within a first transmit beam sweep opportunity corresponding to the transmit beam sweep opportunity parameter, is that a UE may utilize resources (e.g., battery and processing resources) during the transmit beam sweep opportunity to identify beam pairs for establishing a relay link. Further, the UE may maintain the increased signal throughput and quality provided by beamforming and high frequency transmission (e.g., mmW). Further, the processing components of the device may be activated during the indicated transmit beam sweep opportunity, which may help to utilize processing resources efficiently.

In some examples, the configuration receiver 710 may receive the relay link beam sweep configuration that indicates a receive beam sweep opportunity for the first UE, where the relay link beam sweep procedure is performed within a first receive beam sweep opportunity corresponding to the receive beam sweep opportunity parameter. In some examples, the configuration receiver 710 may receive the relay link beam sweep configuration that indicates a periodic resource in which to perform the relay link beam sweep procedure. In some examples, the configuration receiver 710 may receive the relay link beam sweep configuration that indicates that a first set of UEs including the first UE to perform a transmit beam sweep procedure in a first instance of the periodic resource and a second set of UEs including the second UE to perform a receive beam sweep procedure in the first instance of the periodic resource.

One example advantage of receiving the relay link beam sweep configuration that indicates a receive beam sweep opportunity for the first UE, wherein the relay link beam sweep procedure is performed within a first receive beam sweep opportunity corresponding to the receive beam sweep opportunity parameter, is that a UE may utilize resources (e.g., battery and processing resources) during the reception beam sweep opportunity to identify beam pairs for establishing a relay link. Further, the UE may maintain the increased signal throughput and quality provided by beamforming and high frequency transmission (e.g., mmW). Further, the processing components of the device may be activated during the receive beam sweep opportunity, which may help to utilize processing resources efficiently In some examples, the configuration receiver 710 may receive the relay link beam sweep configuration that indicates that a first set of UEs including the first UE to perform a receive beam sweep procedure in a first instance of the periodic resource and a second set of UEs including the second UE to perform a transmit beam sweep procedure in the first instance of the periodic resource. In some cases, the periodic resource is a configured synchronization signal block resource or differs from the configured synchronization signal block resource.

The beam sweep component 715 may perform a relay link beam sweep procedure with the second UE using a set of beams based on the relay link beam sweep configuration. In some examples, the beam sweep component 715 may transmit a reference signal using a first subset of a set of beams in the first transmit beam sweep opportunity and a second subset of the set of beams in a second transmit beam sweep opportunity corresponding to the transmit beam sweep opportunity parameter. In some examples, the beam sweep component 715 may monitor for a reference signal transmitted by the second UE using a first subset of the set of beams in the first receive beam sweep opportunity and a second subset of the set of beams in a second receive beam sweep opportunity corresponding to the receive beam sweep opportunity parameter.

One example advantage of transmitting a reference signal using a first subset of a set of beams in the first transmit beam sweep opportunity and a second subset of the set of beams in a second transmit beam sweep opportunity corresponding to the transmit beam sweep opportunity parameter is that a UE may utilize resources (e.g., battery and processing resources) during the transmit beam sweep opportunity to identify beam pairs for establishing a relay link. Further, different transmission resources may be efficiently used on the first and second set, which may help to efficiently utilize signal transmission resources. Further, the UE may maintain the increased signal throughput and quality provided by beamforming and high frequency transmission (e.g., mmW). Further, the processing components of the device may be activated during the respective transmit beam sweep opportunities, which may help to utilize processing resources efficiently.

One example advantage of monitoring for a reference signal transmitted by the second UE using a first subset of the plurality of beams in the first receive beam sweep opportunity and a second subset of the plurality of beams in a second receive beam sweep opportunity corresponding to the receive beam sweep opportunity parameter, is that a UE may utilize signal reception resources efficiently such to identify relay link beam pairs during the respective receive beam sweep opportunities by identifying the reference signals. Further, the UE may maintain the increased signal throughput and quality provided by beamforming and high frequency transmission (e.g., mmW). Further, the processing components of the device may be activated during the respective receive beam sweep opportunities, which may help to utilize processing resources efficiently.

In some examples, the beam sweep component 715 may generate a measurement for each beam pair of a set of beam pairs based on cycling through the set of beam pairs. In some examples, the beam sweep component 715 may transmit or monitoring for a reference signal generated based on a synchronization signal sequence. In some examples, the beam sweep component 715 may receive a reference signal. In some examples, the beam sweep component 715 may determine to perform the relay link beam sweep procedure based on at least one parameter.

In some examples, the beam sweep component 715 may detect each beam pair of a set of beam pairs does not satisfy a threshold based on performing the relay link beam sweep procedure. In some examples, the beam sweep component 715 may repeat the relay link beam sweep procedure to identify the first beam pair. In some examples, the beam sweep component 715 may wait for a random backoff time period prior to repeat the relay link beam sweep procedure.

In some cases, the at least one parameter is one or more of a network identifier, a cell identifier, a radio network temporary identifier, a temporary mobile subscriber identity, a temporary identifier, or any combination thereof.

The beam selection component 720 may select a first beam pair based on the relay link beam sweep procedure. In some examples, the beam selection component 720 may select the first beam pair based on the measurements.

The relay link component 725 may establish a relay link with the second UE using the first beam pair. In some examples, the relay link component 725 may transmit a random access channel message to the second UE using a transmission beam of the first beam pair at the first UE. In some examples, the relay link component 725 may receive a random access channel response from the second UE using a receive beam of the first beam pair at the first UE. In some examples, the relay link component 725 may transmit a random access request to the second UE in a random access opportunity.

In some examples, the relay link component 725 may receive a random access response from the second UE based on the random access request. In some examples, the relay link component 725 may receive a random access request from the second UE in a first random access opportunity or a second random access opportunity that occurs after the first random access opportunity. In some examples, the relay link component 725 may transmit a random access response to the first UE based on the random access request.

The beam report component 730 may transmit, to the base station, a measurement report including one or more of the measurements, where the relay link is established based on receiving an instruction from the base station to establish the relay link using the first beam pair. In some examples, the beam report component 730 may transmit an identifier of the second UE, beam pair information of the first beam pair, or both, to the base station.

The decoding component 735 may decode a synchronization signal sequence from the reference signal. The timing offset component 740 may determine a timing offset based on the synchronization signal sequence, where the relay link is established based on the timing offset. The communication component 745 may transmit data to the second UE via the relay link for forwarding to the base station. In some examples, the communication component 745 may receive data from the base station via the second UE and the relay link.

Figure 8:
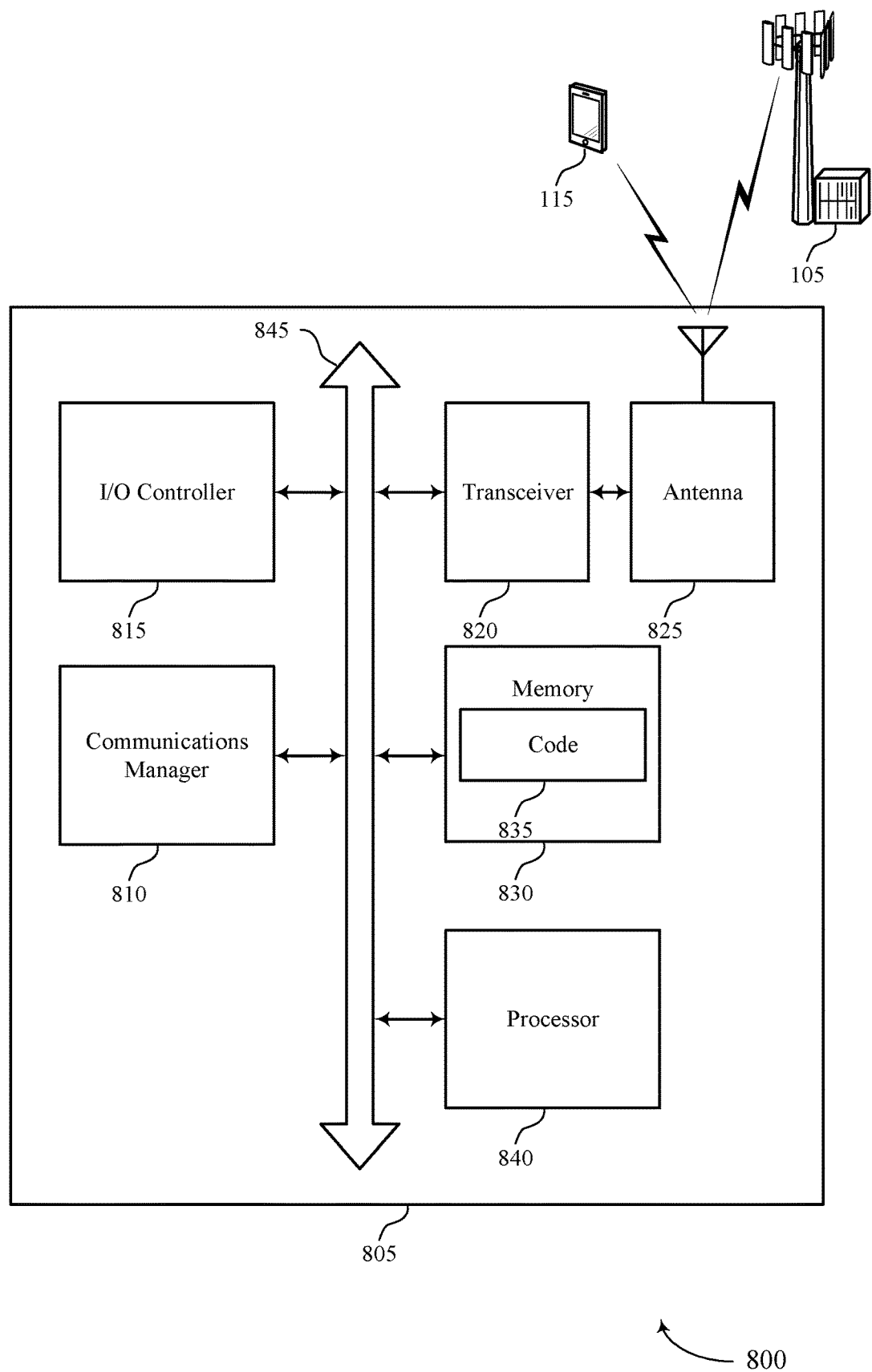
FIG. 8 shows a diagram of a system including a device that supports establishment of a UE to UE relay link in accordance with aspects of the present disclosure.

FIG. 8 shows a diagram of a system 800 including a device 805 that supports establishment of a UE to UE relay link in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a relay link beam sweep configuration from a base station for establishing a relay link with a second UE, perform a relay link beam sweep procedure with the second UE using a set of beams based on the relay link beam sweep configuration, select a first beam pair based on the relay link beam sweep procedure, and establish a relay link with the second UE using the first beam pair.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting establishment of a UE to UE relay link).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
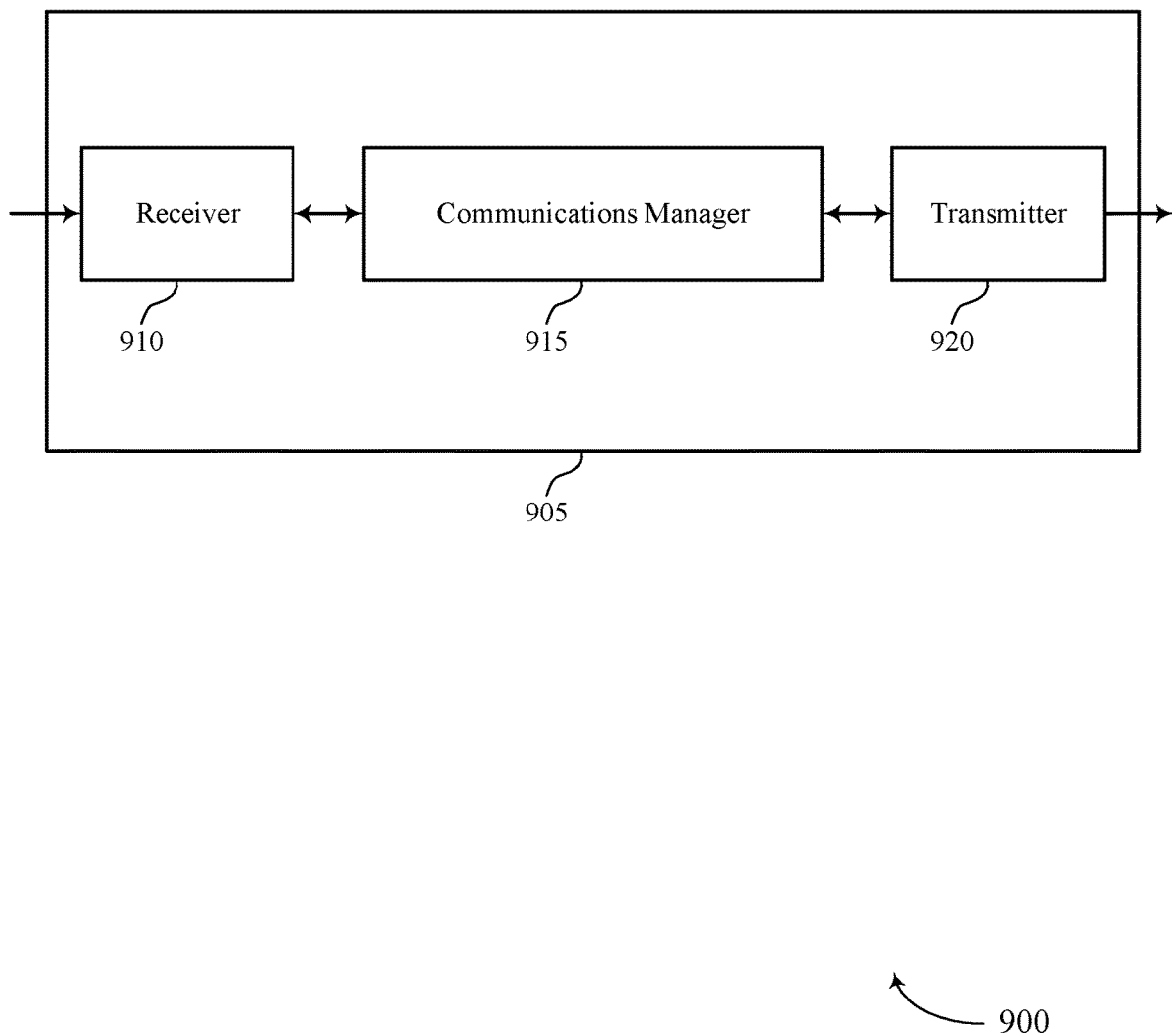
FIGS. 9 and 10 show block diagrams of devices that support establishment of a UE to UE relay link in accordance with aspects of the present disclosure.

FIG. 9 shows a block diagram 900 of a device 905 that supports establishment of a UE to UE relay link in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to establishment of a UE to UE relay link, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a relay link beam sweep configuration to a first UE and a second UE and receive an indication of a relay link established between the first UE and the second UE based on the relay link beam sweep configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
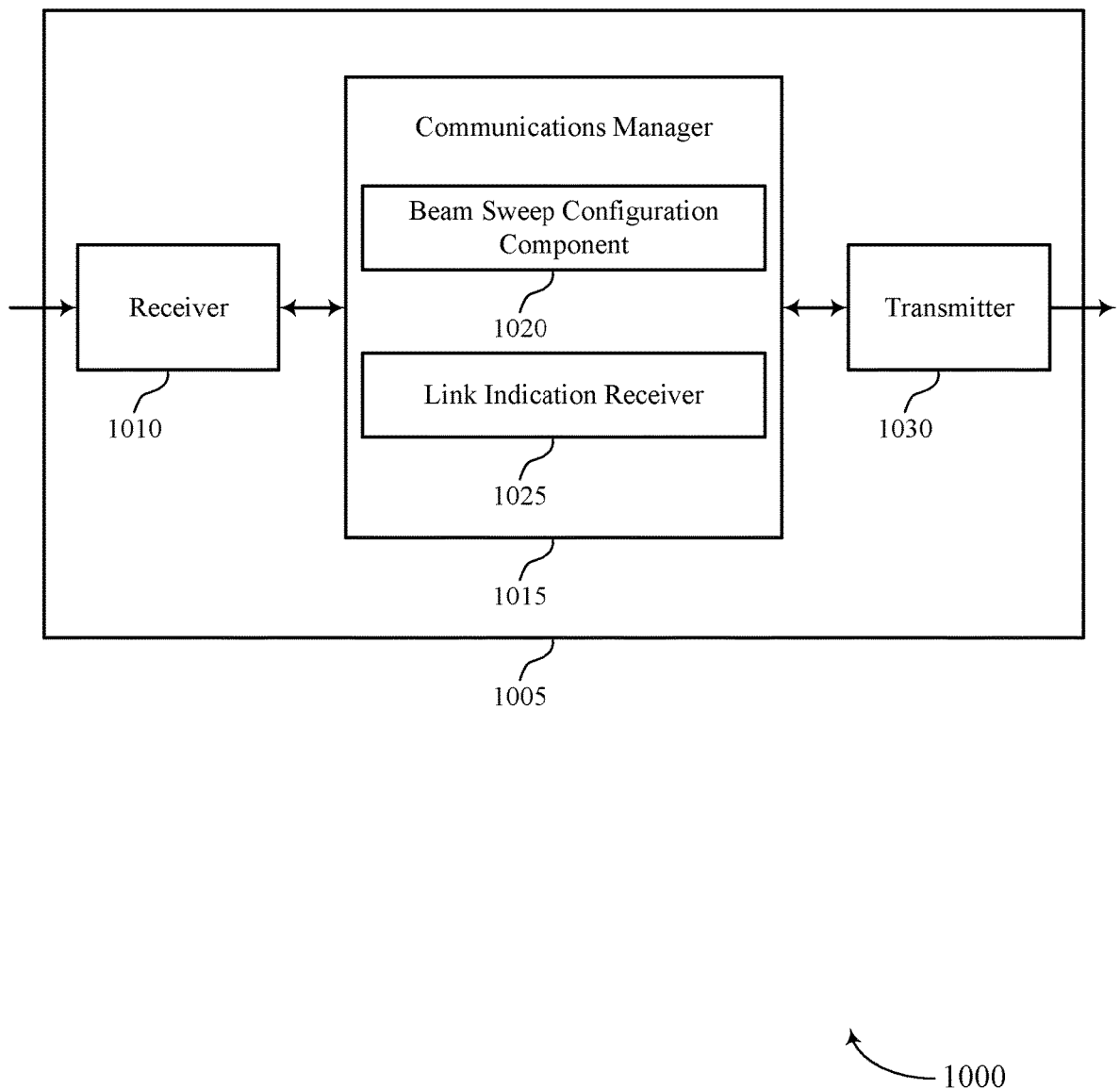

FIG. 10 shows a block diagram 1000 of a device 1005 that supports establishment of a UE to UE relay link in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to establishment of a UE to UE relay link, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a beam sweep configuration component 1020 and a link indication receiver 1025. The communications manager 1015 may be an example of aspects of the communications manager 1210 described herein.

The beam sweep configuration component 1020 may transmit a relay link beam sweep configuration to a first UE and a second UE. The link indication receiver 1025 may receive an indication of a relay link established between the first UE and the second UE based on the relay link beam sweep configuration.

The transmitter 1030 may transmit signals generated by other components of the device 1005. In some examples, the transmitter 1030 may be collocated with a receiver 1010 in a transceiver component. For example, the transmitter 1030 may be an example of aspects of the transceiver 1220 described with reference to FIG. 12. The transmitter 1030 may utilize a single antenna or a set of antennas.

Figure 11:
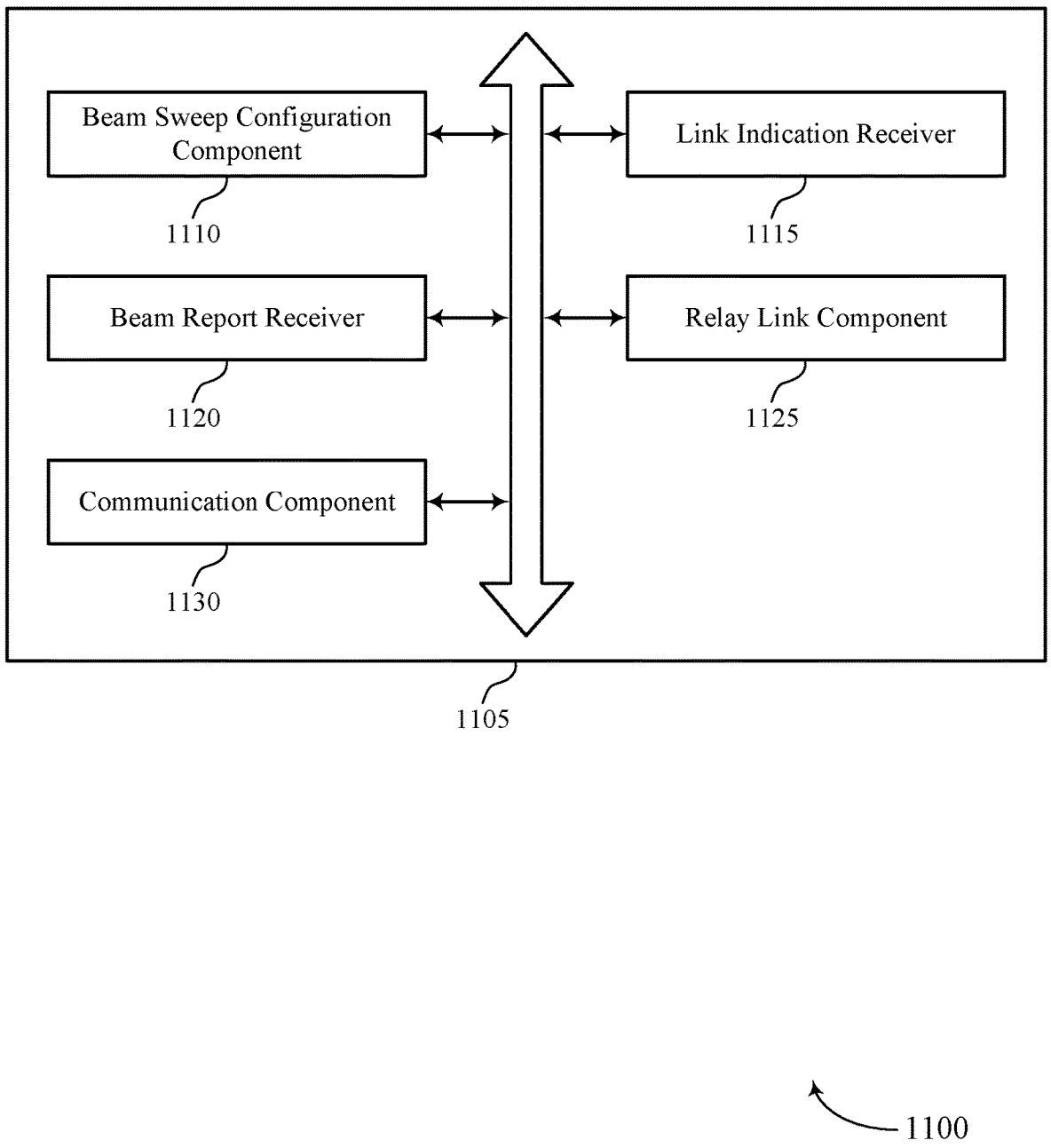
FIG. 11 shows a block diagram of a communications manager that supports establishment of a UE to UE relay link in accordance with aspects of the present disclosure.

FIG. 11 shows a block diagram 1100 of a communications manager 1105 that supports establishment of a UE to UE relay link in accordance with aspects of the present disclosure. The communications manager 1105 may be an example of aspects of a communications manager 915, a communications manager 1015, or a communications manager 1210 described herein. The communications manager 1105 may include a beam sweep configuration component 1110, a link indication receiver 1115, a beam report receiver 1120, a relay link component 1125, and a communication component 1130. Each of these components may communicate, directly or indirectly, with one another (e.g., via one or more buses).

The beam sweep configuration component 1110 may transmit a relay link beam sweep configuration to a first UE and a second UE. In some examples, the beam sweep configuration component 1110 may transmit the relay link beam sweep configuration that indicates a beam sweep opportunity parameter for indicating at least one opportunity to perform a relay link beam sweep procedure.

In some examples, the beam sweep configuration component 1110 may transmit the relay link beam sweep configuration that indicates a periodic resource in which to perform a relay link beam sweep procedure. In some examples, the beam sweep configuration component 1110 may transmit the relay link beam sweep configuration that indicates that a first set of UEs including the first UE to perform a transmit beam sweep procedure in a first instance of the periodic resource and a second set of UEs including the second UE to perform a receive beam sweep procedure in the first instance of the periodic resource.

In some examples, the beam sweep configuration component 1110 may transmit the relay link beam sweep configuration that indicates that a first set of UEs including the first UE to perform a receive beam sweep procedure in a first instance of the periodic resource and a second set of UEs including the second UE to perform a transmit beam sweep procedure in the first instance of the periodic resource. In some cases, the periodic resource is a configured synchronization signal block resource or differs from the configured synchronization signal block resource.

The link indication receiver 1115 may receive an indication of a relay link established between the first UE and the second UE based on the relay link beam sweep configuration. The beam report receiver 1120 may receive, from the first UE, the second UE, or both, a measurement report including one or more of beam pair measurements.

In some examples, the beam report receiver 1120 may receive an identifier of the first UE, the second UE, or both, beam pair information of a first beam pair used to establish the relay link, or both. The relay link component 1125 may transmit an instruction to the first UE, the second UE, or both to establish the relay link using a beam pair based on the measurement report.

The communication component 1130 may receive, from the second UE, data of the first UE that has been received by the second UE via the relay link and forwarded to the base station. In some examples, the communication component 1130 may transmit data to the second UE for forwarding to the first UE via the relay link.

Figure 12:
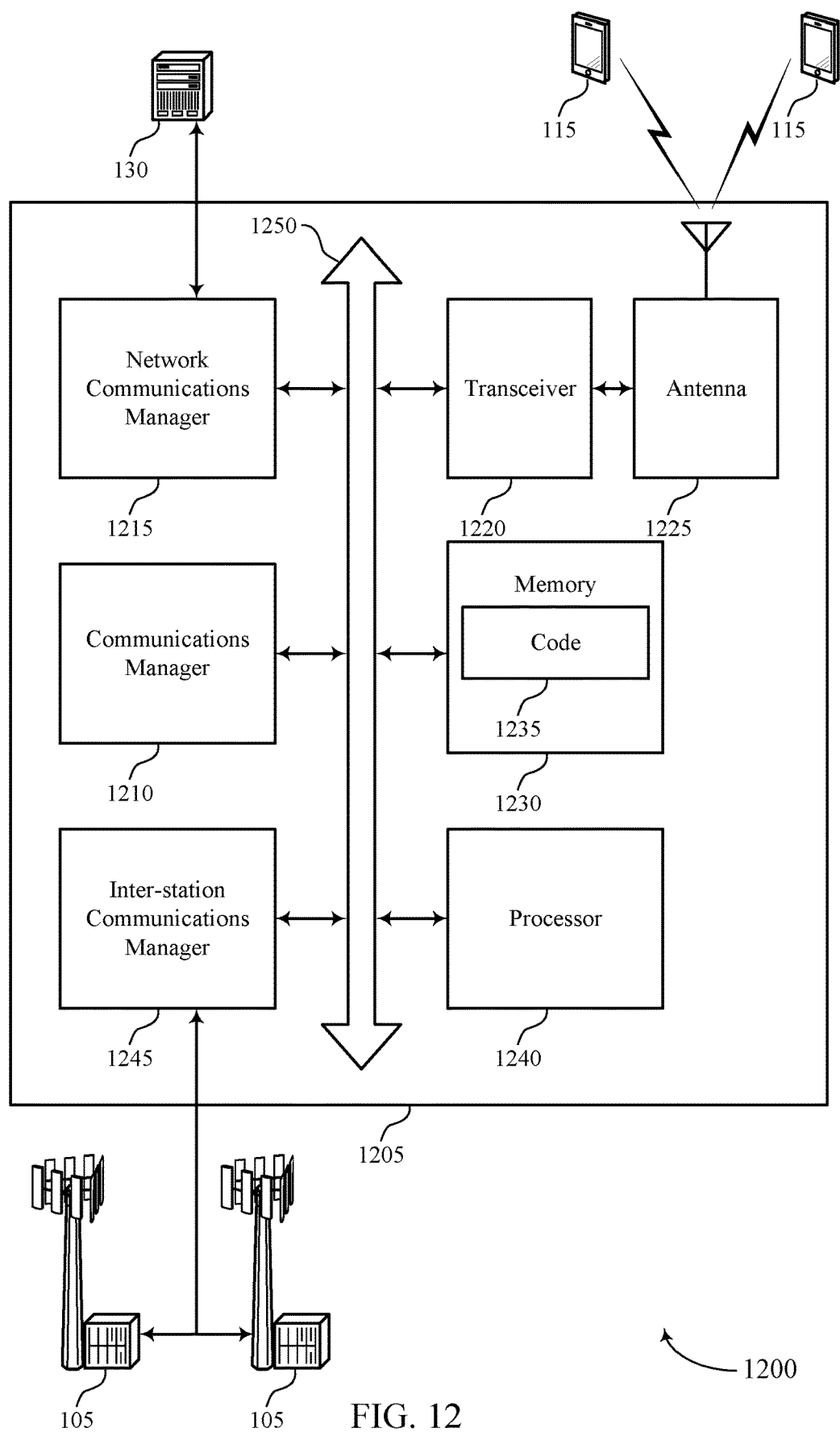
FIG. 12 shows a diagram of a system including a device that supports establishment of a UE to UE relay link in accordance with aspects of the present disclosure.

FIG. 12 shows a diagram of a system 1200 including a device 1205 that supports establishment of a UE to UE relay link in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a relay link beam sweep configuration to a first UE and a second UE and receive an indication of a relay link established between the first UE and the second UE based on the relay link beam sweep configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting establishment of a UE to UE relay link).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
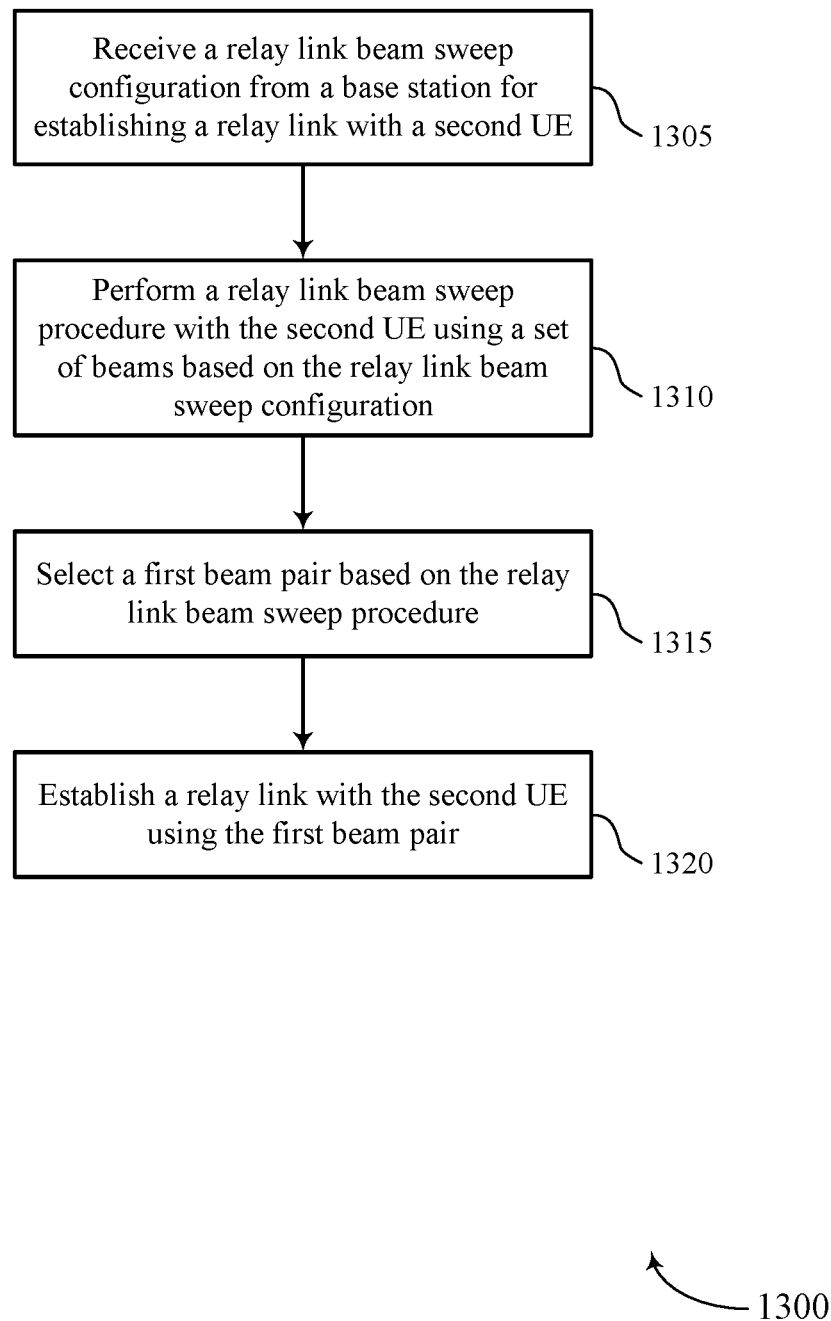
FIGS. 13 through 21 show flowcharts illustrating methods that support establishment of a UE to UE relay link in accordance with aspects of the present disclosure.

FIG. 13 shows a flowchart illustrating a method 1300 that supports establishment of a UE to UE relay link in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive a relay link beam sweep configuration from a base station for establishing a relay link with a second UE. The operations of 1305 may be performed according to the methods described herein. In some examples, aspects of the operations of 1305 may be performed by a configuration receiver as described with reference to FIGS. 5 through 8.

At 1310, the UE may perform a relay link beam sweep procedure with the second UE using a set of beams based on the relay link beam sweep configuration. The operations of 1310 may be performed according to the methods described herein. In some examples, aspects of the operations of 1310 may be performed by a beam sweep component as described with reference to FIGS. 5 through 8.

At 1315, the UE may select a first beam pair based on the relay link beam sweep procedure. The operations of 1315 may be performed according to the methods described herein. In some examples, aspects of the operations of 1315 may be performed by a beam selection component as described with reference to FIGS. 5 through 8.

At 1320, the UE may establish a relay link with the second UE using the first beam pair. The operations of 1320 may be performed according to the methods described herein. In some examples, aspects of the operations of 1320 may be performed by a relay link component as described with reference to FIGS. 5 through 8.

Figure 14:
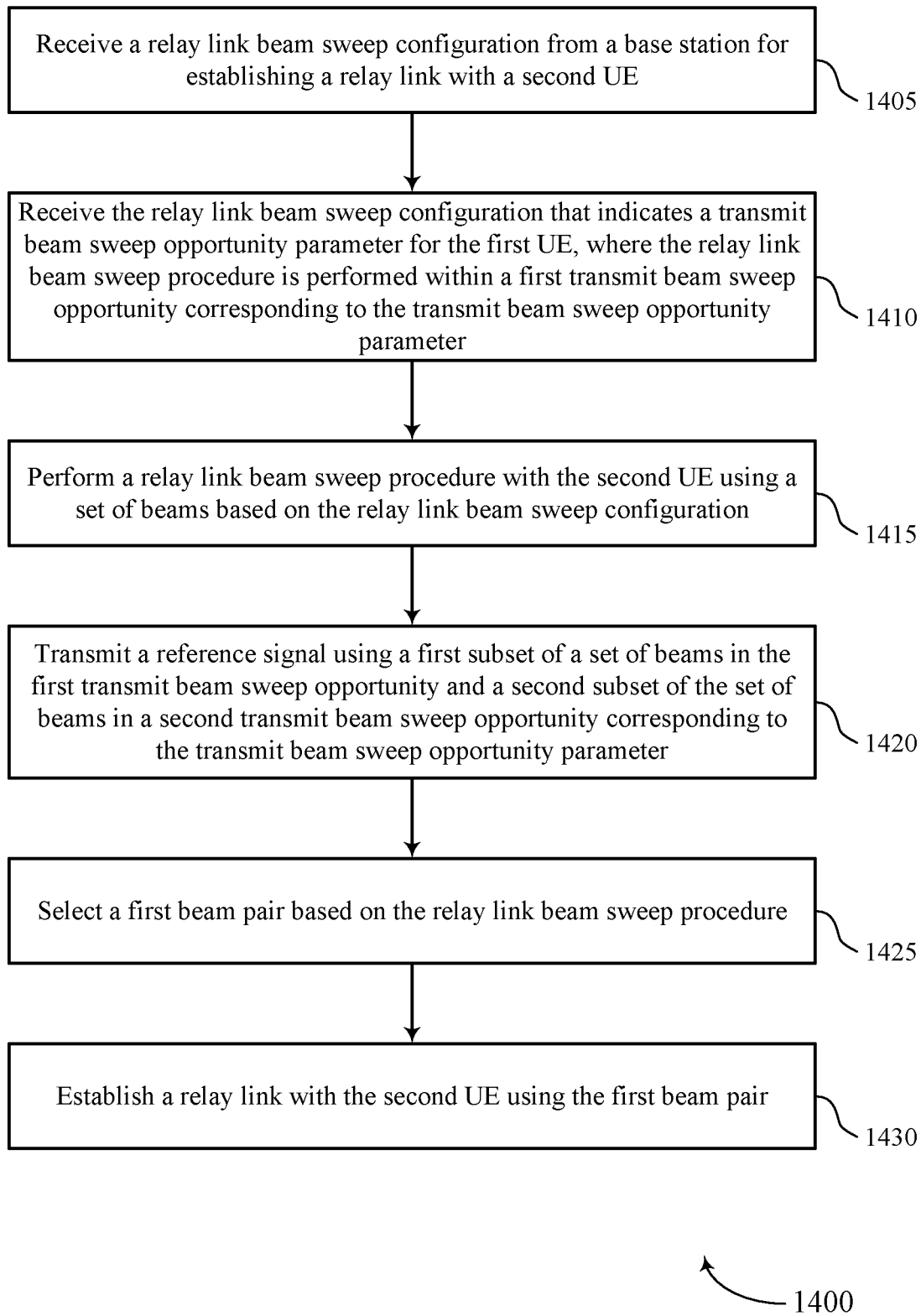

FIG. 14 shows a flowchart illustrating a method 1400 that supports establishment of a UE to UE relay link in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive a relay link beam sweep configuration from a base station for establishing a relay link with a second UE. The operations of 1405 may be performed according to the methods described herein. In some examples, aspects of the operations of 1405 may be performed by a configuration receiver as described with reference to FIGS. 5 through 8.

At 1410, the UE may receive the relay link beam sweep configuration that indicates a transmit beam sweep opportunity parameter for the first UE, where the relay link beam sweep procedure is performed within a first transmit beam sweep opportunity corresponding to the transmit beam sweep opportunity parameter. The operations of 1410 may be performed according to the methods described herein. In some examples, aspects of the operations of 1410 may be performed by a configuration receiver as described with reference to FIGS. 5 through 8.

At 1415, the UE may perform a relay link beam sweep procedure with the second UE using a set of beams based on the relay link beam sweep configuration. The operations of 1415 may be performed according to the methods described herein. In some examples, aspects of the operations of 1415 may be performed by a beam sweep component as described with reference to FIGS. 5 through 8.

At 1420, the UE may transmit a reference signal using a first subset of a set of beams in the first transmit beam sweep opportunity and a second subset of the set of beams in a second transmit beam sweep opportunity corresponding to the transmit beam sweep opportunity parameter. The operations of 1420 may be performed according to the methods described herein. In some examples, aspects of the operations of 1420 may be performed by a beam sweep component as described with reference to FIGS. 5 through 8.

At 1425, the UE may select a first beam pair based on the relay link beam sweep procedure. The operations of 1425 may be performed according to the methods described herein. In some examples, aspects of the operations of 1425 may be performed by a beam selection component as described with reference to FIGS. 5 through 8.

At 1430, the UE may establish a relay link with the second UE using the first beam pair. The operations of 1430 may be performed according to the methods described herein. In some examples, aspects of the operations of 1430 may be performed by a relay link component as described with reference to FIGS. 5 through 8.

Figure 15:
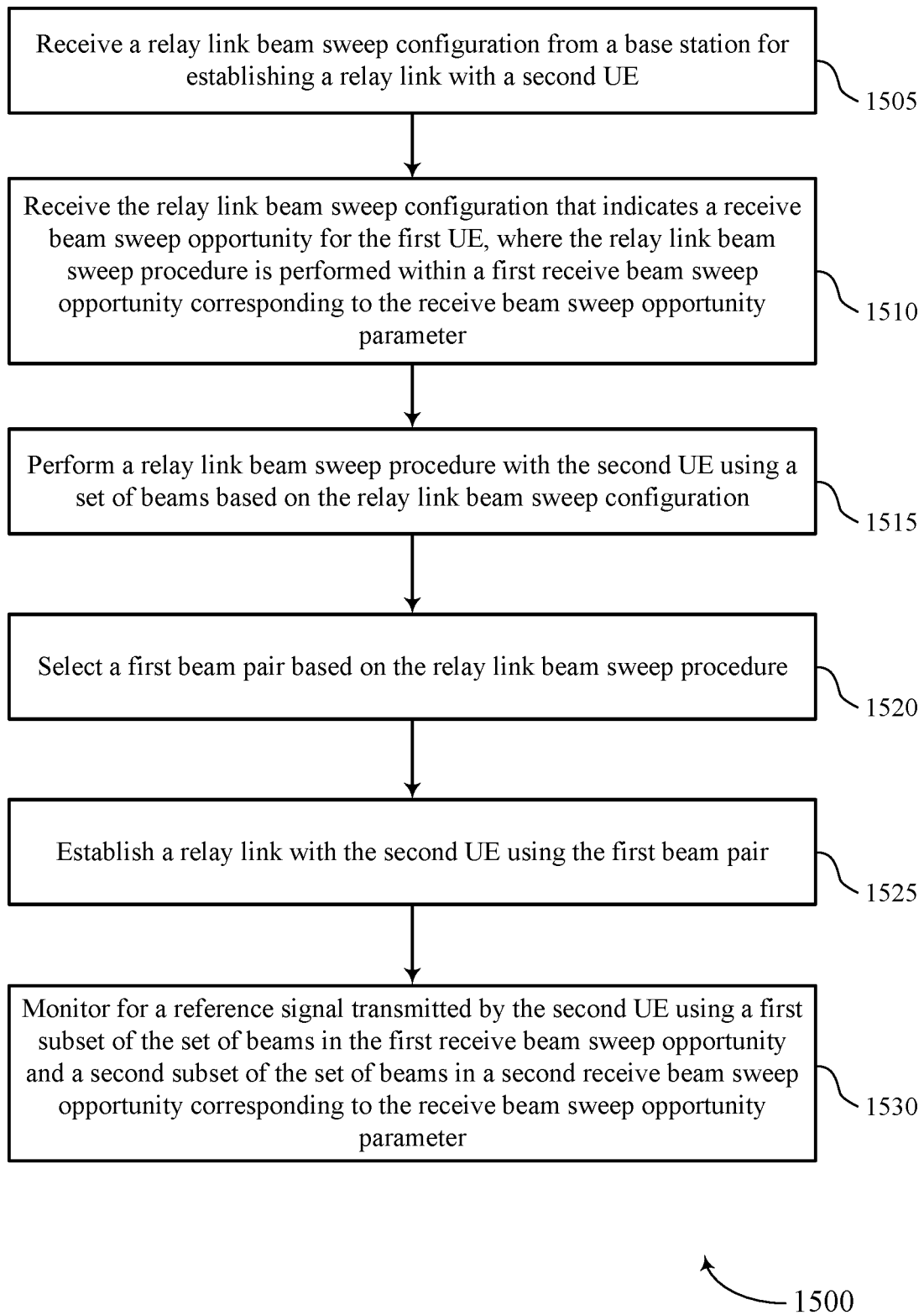

FIG. 15 shows a flowchart illustrating a method 1500 that supports establishment of a UE to UE relay link in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive a relay link beam sweep configuration from a base station for establishing a relay link with a second UE. The operations of 1505 may be performed according to the methods described herein. In some examples, aspects of the operations of 1505 may be performed by a configuration receiver as described with reference to FIGS. 5 through 8.

At 1510, the UE may receive the relay link beam sweep configuration that indicates a receive beam sweep opportunity for the first UE, where the relay link beam sweep procedure is performed within a first receive beam sweep opportunity corresponding to the receive beam sweep opportunity parameter. The operations of 1510 may be performed according to the methods described herein. In some examples, aspects of the operations of 1510 may be performed by a configuration receiver as described with reference to FIGS. 5 through 8.

At 1515, the UE may perform a relay link beam sweep procedure with the second UE using a set of beams based on the relay link beam sweep configuration. The operations of 1515 may be performed according to the methods described herein. In some examples, aspects of the operations of 1515 may be performed by a beam sweep component as described with reference to FIGS. 5 through 8.

At 1520, the UE may select a first beam pair based on the relay link beam sweep procedure. The operations of 1520 may be performed according to the methods described herein. In some examples, aspects of the operations of 1520 may be performed by a beam selection component as described with reference to FIGS. 5 through 8.

At 1525, the UE may establish a relay link with the second UE using the first beam pair. The operations of 1525 may be performed according to the methods described herein. In some examples, aspects of the operations of 1525 may be performed by a relay link component as described with reference to FIGS. 5 through 8.

At 1530, the UE may monitor for a reference signal transmitted by the second UE using a first subset of the set of beams in the first receive beam sweep opportunity and a second subset of the set of beams in a second receive beam sweep opportunity corresponding to the receive beam sweep opportunity parameter. The operations of 1530 may be performed according to the methods described herein. In some examples, aspects of the operations of 1530 may be performed by a beam sweep component as described with reference to FIGS. 5 through 8.

Figure 16:
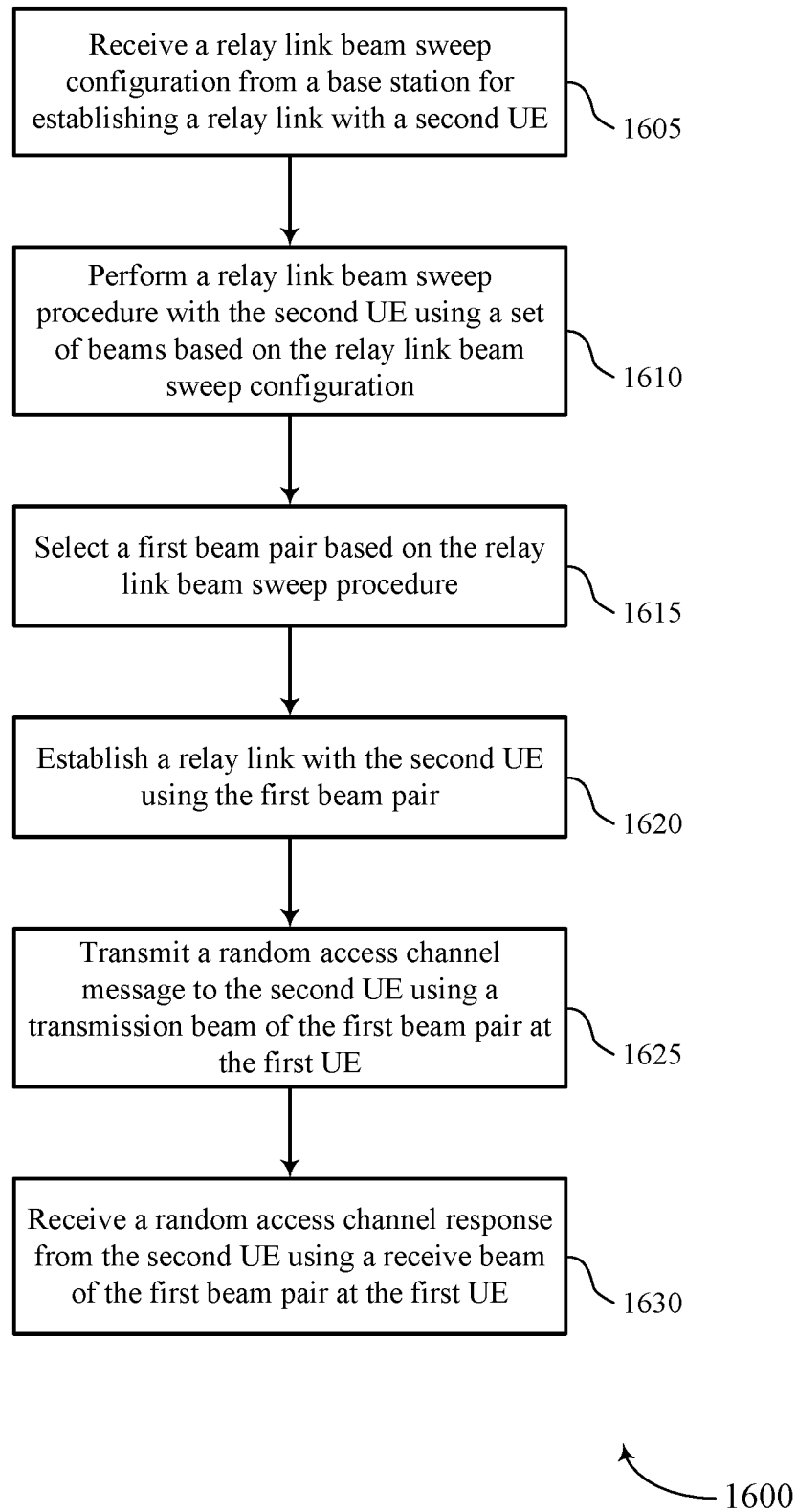

FIG. 16 shows a flowchart illustrating a method 1600 that supports establishment of a UE to UE relay link in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive a relay link beam sweep configuration from a base station for establishing a relay link with a second UE. The operations of 1605 may be performed according to the methods described herein. In some examples, aspects of the operations of 1605 may be performed by a configuration receiver as described with reference to FIGS. 5 through 8.

At 1610, the UE may perform a relay link beam sweep procedure with the second UE using a set of beams based on the relay link beam sweep configuration. The operations of 1610 may be performed according to the methods described herein. In some examples, aspects of the operations of 1610 may be performed by a beam sweep component as described with reference to FIGS. 5 through 8.

At 1615, the UE may select a first beam pair based on the relay link beam sweep procedure. The operations of 1615 may be performed according to the methods described herein. In some examples, aspects of the operations of 1615 may be performed by a beam selection component as described with reference to FIGS. 5 through 8.

At 1620, the UE may establish a relay link with the second UE using the first beam pair. The operations of 1620 may be performed according to the methods described herein. In some examples, aspects of the operations of 1620 may be performed by a relay link component as described with reference to FIGS. 5 through 8.

At 1625, the UE may transmit a random access channel message to the second UE using a transmission beam of the first beam pair at the first UE. The operations of 1625 may be performed according to the methods described herein. In some examples, aspects of the operations of 1625 may be performed by a relay link component as described with reference to FIGS. 5 through 8.

At 1630, the UE may receive a random access channel response from the second UE using a receive beam of the first beam pair at the first UE. The operations of 1630 may be performed according to the methods described herein. In some examples, aspects of the operations of 1630 may be performed by a relay link component as described with reference to FIGS. 5 through 8.

Figure 17:
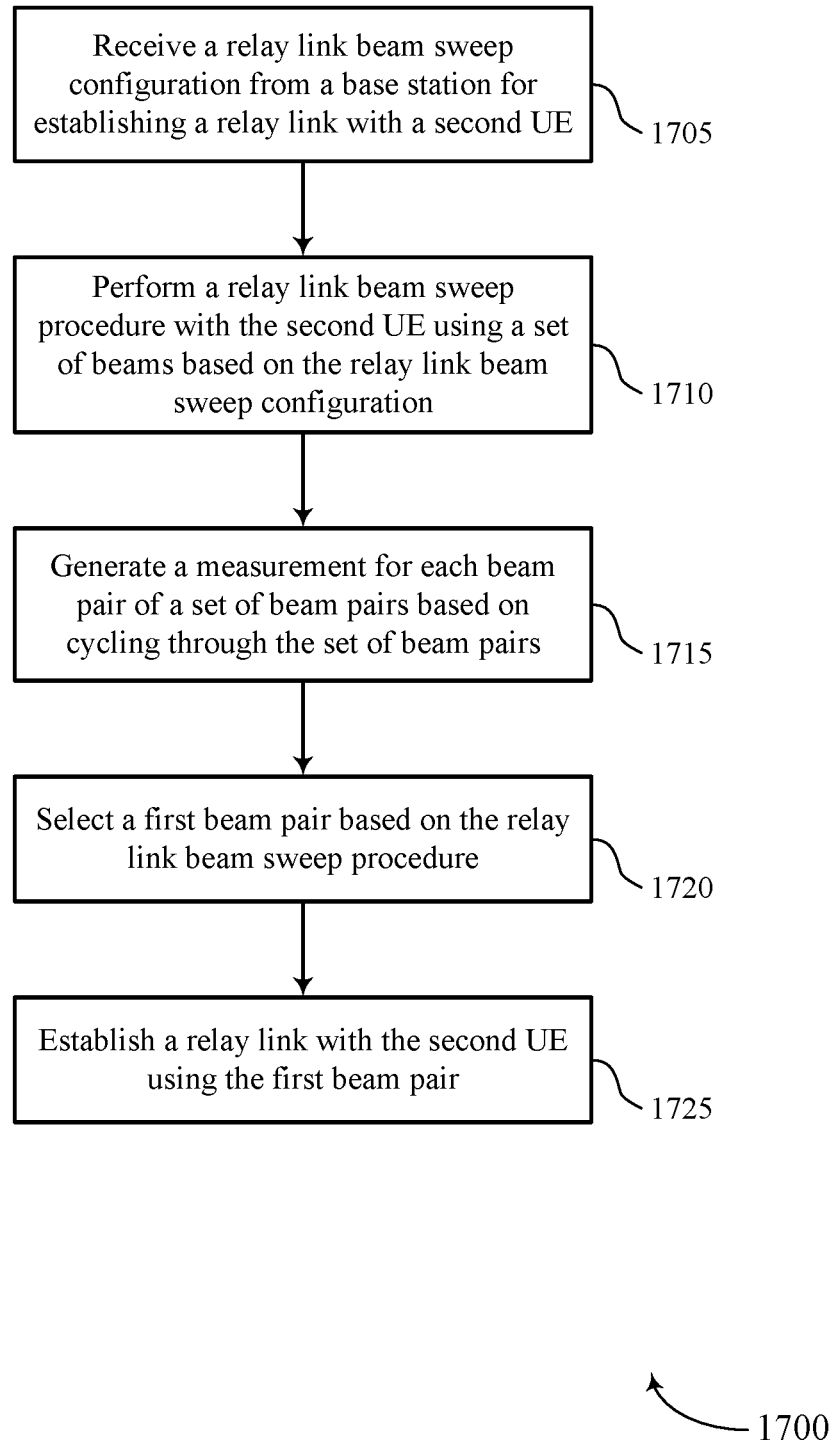

FIG. 17 shows a flowchart illustrating a method 1700 that supports establishment of a UE to UE relay link in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1705, the UE may receive a relay link beam sweep configuration from a base station for establishing a relay link with a second UE. The operations of 1705 may be performed according to the methods described herein. In some examples, aspects of the operations of 1705 may be performed by a configuration receiver as described with reference to FIGS. 5 through 8.

At 1710, the UE may perform a relay link beam sweep procedure with the second UE using a set of beams based on the relay link beam sweep configuration. The operations of 1710 may be performed according to the methods described herein. In some examples, aspects of the operations of 1710 may be performed by a beam sweep component as described with reference to FIGS. 5 through 8.

At 1715, the UE may generate a measurement for each beam pair of a set of beam pairs based on cycling through the set of beam pairs. The operations of 1715 may be performed according to the methods described herein. In some examples, aspects of the operations of 1715 may be performed by a beam sweep component as described with reference to FIGS. 5 through 8.

At 1720, the UE may select a first beam pair based on the relay link beam sweep procedure. The operations of 1720 may be performed according to the methods described herein. In some examples, aspects of the operations of 1720 may be performed by a beam selection component as described with reference to FIGS. 5 through 8.

At 1725, the UE may establish a relay link with the second UE using the first beam pair. The operations of 1725 may be performed according to the methods described herein. In some examples, aspects of the operations of 1725 may be performed by a relay link component as described with reference to FIGS. 5 through 8.

Figure 18:
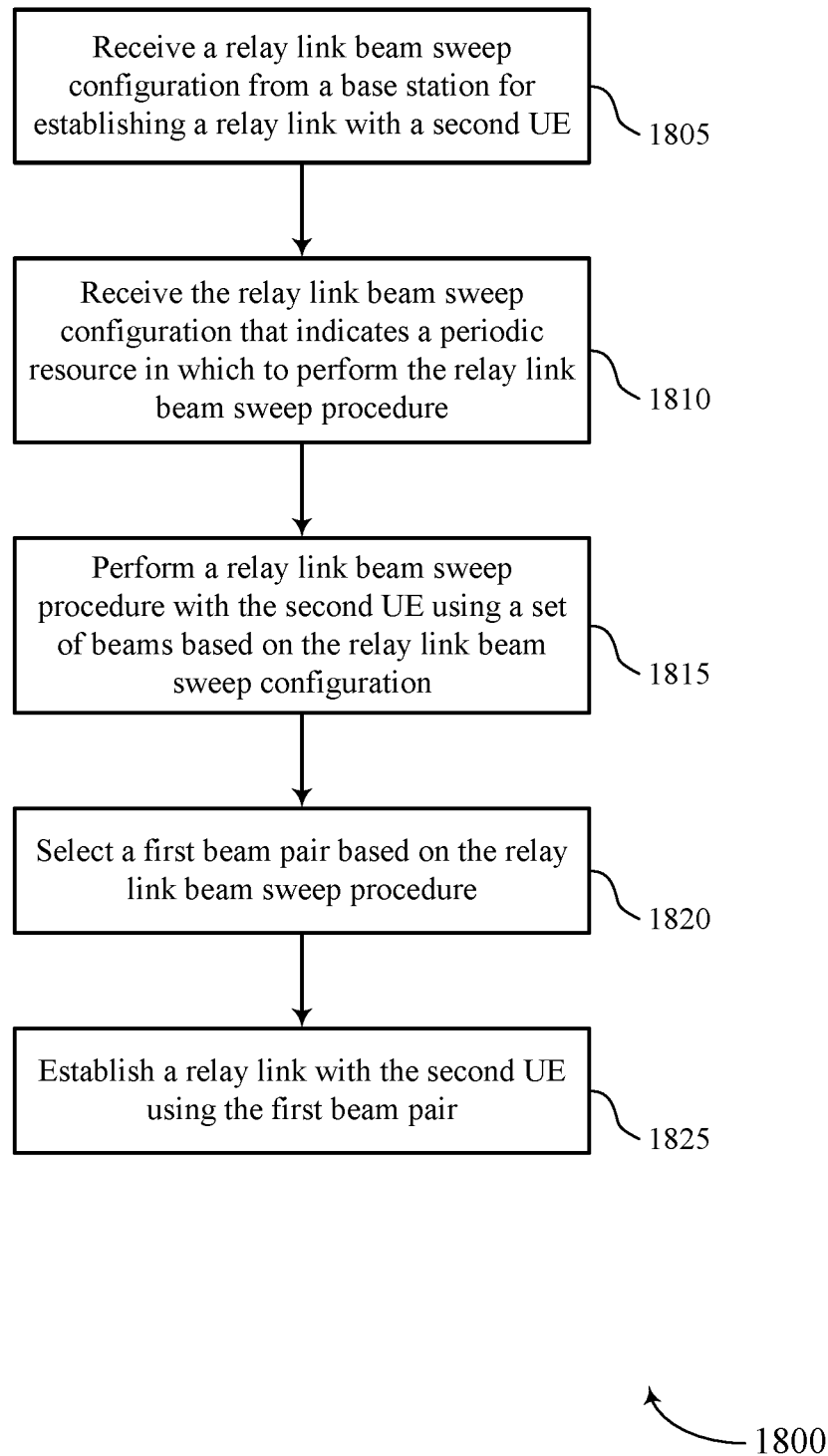

FIG. 18 shows a flowchart illustrating a method 1800 that supports establishment of a UE to UE relay link in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1805, the UE may receive a relay link beam sweep configuration from a base station for establishing a relay link with a second UE. The operations of 1805 may be performed according to the methods described herein. In some examples, aspects of the operations of 1805 may be performed by a configuration receiver as described with reference to FIGS. 5 through 8.

At 1810, the UE may receive the relay link beam sweep configuration that indicates a periodic resource in which to perform the relay link beam sweep procedure. The operations of 1810 may be performed according to the methods described herein. In some examples, aspects of the operations of 1810 may be performed by a configuration receiver as described with reference to FIGS. 5 through 8.

At 1815, the UE may perform a relay link beam sweep procedure with the second UE using a set of beams based on the relay link beam sweep configuration. The operations of 1815 may be performed according to the methods described herein. In some examples, aspects of the operations of 1815 may be performed by a beam sweep component as described with reference to FIGS. 5 through 8.

At 1820, the UE may select a first beam pair based on the relay link beam sweep procedure. The operations of 1820 may be performed according to the methods described herein. In some examples, aspects of the operations of 1820 may be performed by a beam selection component as described with reference to FIGS. 5 through 8.

At 1825, the UE may establish a relay link with the second UE using the first beam pair. The operations of 1825 may be performed according to the methods described herein. In some examples, aspects of the operations of 1825 may be performed by a relay link component as described with reference to FIGS. 5 through 8.

Figure 19:
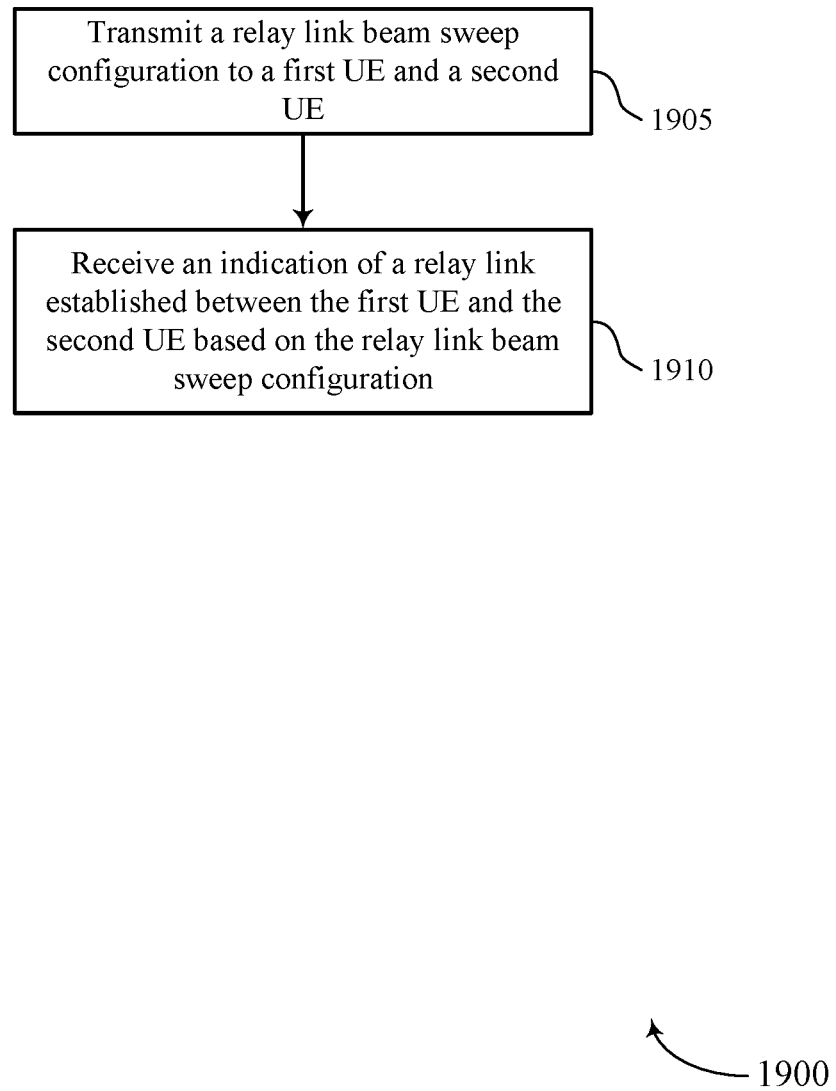

FIG. 19 shows a flowchart illustrating a method 1900 that supports establishment of a UE to UE relay link in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1905, the base station may transmit a relay link beam sweep configuration to a first UE and a second UE. The operations of 1905 may be performed according to the methods described herein. In some examples, aspects of the operations of 1905 may be performed by a beam sweep configuration component as described with reference to FIGS. 9 through 12.

At 1910, the base station may receive an indication of a relay link established between the first UE and the second UE based on the relay link beam sweep configuration. The operations of 1910 may be performed according to the methods described herein. In some examples, aspects of the operations of 1910 may be performed by a link indication receiver as described with reference to FIGS. 9 through 12.

Figure 20:
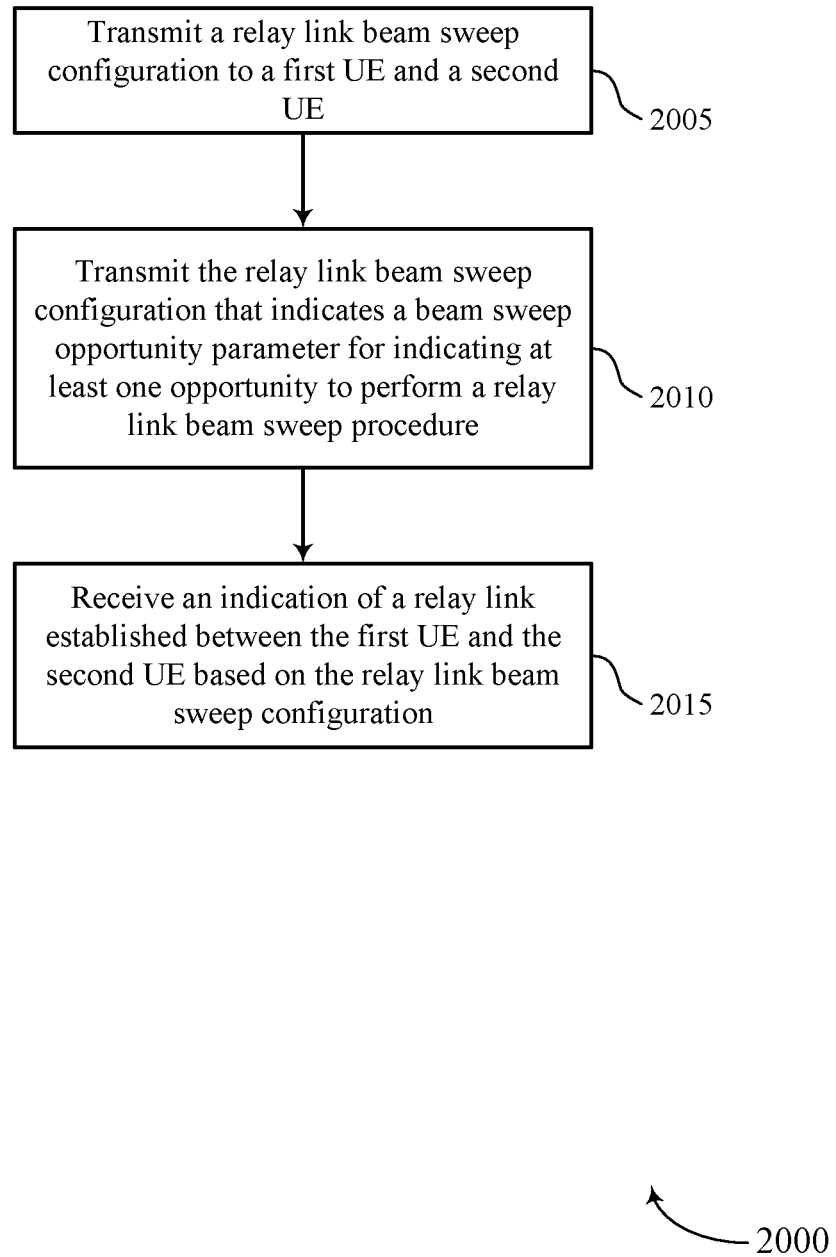

FIG. 20 shows a flowchart illustrating a method 2000 that supports establishment of a UE to UE relay link in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 2005, the base station may transmit a relay link beam sweep configuration to a first UE and a second UE. The operations of 2005 may be performed according to the methods described herein. In some examples, aspects of the operations of 2005 may be performed by a beam sweep configuration component as described with reference to FIGS. 9 through 12.

At 2010, the base station may transmit the relay link beam sweep configuration that indicates a beam sweep opportunity parameter for indicating at least one opportunity to perform a relay link beam sweep procedure. The operations of 2010 may be performed according to the methods described herein. In some examples, aspects of the operations of 2010 may be performed by a beam sweep configuration component as described with reference to FIGS. 9 through 12.

At 2015, the base station may receive an indication of a relay link established between the first UE and the second UE based on the relay link beam sweep configuration. The operations of 2015 may be performed according to the methods described herein. In some examples, aspects of the operations of 2015 may be performed by a link indication receiver as described with reference to FIGS. 9 through 12.

Figure 21:
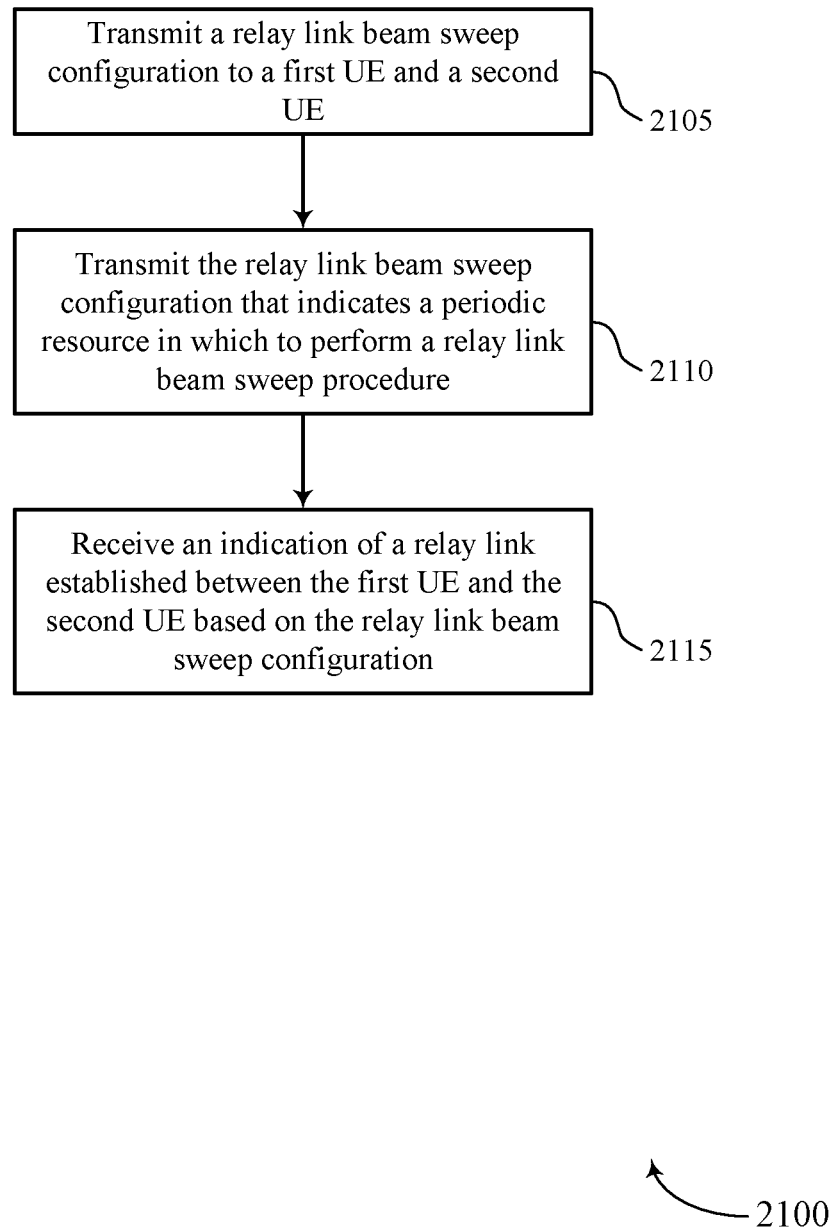

FIG. 21 shows a flowchart illustrating a method 2100 that supports establishment of a UE to UE relay link in accordance with aspects of the present disclosure. The operations of method 2100 may be implemented by a base station 105 or its components as described herein. For example, the operations of method 2100 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 2105, the base station may transmit a relay link beam sweep configuration to a first UE and a second UE. The operations of 2105 may be performed according to the methods described herein. In some examples, aspects of the operations of 2105 may be performed by a beam sweep configuration component as described with reference to FIGS. 9 through 12.

At 2110, the base station may transmit the relay link beam sweep configuration that indicates a periodic resource in which to perform a relay link beam sweep procedure. The operations of 2110 may be performed according to the methods described herein. In some examples, aspects of the operations of 2110 may be performed by a beam sweep configuration component as described with reference to FIGS. 9 through 12.

At 2115, the base station may receive an indication of a relay link established between the first UE and the second UE based on the relay link beam sweep configuration. The operations of 2115 may be performed according to the methods described herein. In some examples, aspects of the operations of 2115 may be performed by a link indication receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first user equipment (UE), comprising:
    receiving a relay link beam sweep configuration from a base station for establishing a relay link with a second UE, wherein the relay link beam sweep configuration indicates a transmit beam sweep opportunity for the first UE, a receive beam sweep opportunity for the first UE, or both;
    performing a relay link beam sweep procedure with the second UE using a plurality of beams based at least in part on the relay link beam sweep configuration, wherein the relay link beam sweep procedure is performed during the transmit beam sweep opportunity, the receive beam sweep opportunity, or both;
    selecting a first beam pair based at least in part on the relay link beam sweep procedure; and
    establishing a relay link with the second UE using the first beam pair.

2. The method of claim 1, wherein receiving the relay link beam sweep configuration comprises:
    receiving the relay link beam sweep configuration that indicates a transmit beam sweep opportunity parameter for the first UE, wherein the relay link beam sweep procedure is performed within a first transmit beam sweep opportunity corresponding to the transmit beam sweep opportunity parameter.

3. The method of claim 2, wherein performing the relay link beam sweep procedure comprises:
    transmitting a reference signal using a first subset of a plurality of beams in the first transmit beam sweep opportunity and a second subset of the plurality of beams in a second transmit beam sweep opportunity corresponding to the transmit beam sweep opportunity parameter.

4. The method of claim 1, wherein receiving the relay link beam sweep configuration comprises:
    receiving the relay link beam sweep configuration that indicates a receive beam sweep opportunity parameter for the first UE, wherein the relay link beam sweep procedure is performed within a first receive beam sweep opportunity corresponding to the receive beam sweep opportunity parameter.

5. The method of claim 4, wherein performing the relay link beam sweep procedure comprises:
    monitoring for a reference signal transmitted by the second UE using a first subset of the plurality of beams in the first receive beam sweep opportunity and a second subset of the plurality of beams in a second receive beam sweep opportunity corresponding to the receive beam sweep opportunity parameter.

6. The method of claim 1, wherein establishing the relay link with the second UE comprises:
    transmitting a random access channel message to the second UE using a transmission beam of the first beam pair at the first UE; and
    receiving a random access channel response from the second UE using a receive beam of the first beam pair at the first UE.

7. The method of claim 1, wherein performing the relay link beam sweep procedure comprises:
    generating a measurement for each beam pair of a plurality of beam pairs based at least in part on cycling through the plurality of beam pairs.

8. The method of claim 7, further comprising:
    selecting the first beam pair based at least in part on the measurements.

9. The method of claim 7, further comprising:
    transmitting, to the base station, a measurement report comprising one or more of the measurements, wherein the relay link is established based at least in part on receiving an instruction from the base station to establish the relay link using the first beam pair.

10. The method of claim 1, wherein performing the relay link beam sweep procedure comprises:
transmitting or monitoring for a reference signal generated based at least in part on a synchronization signal sequence.

11. The method of claim 1, wherein performing the relay link beam sweep procedure comprises:
receiving a reference signal;
decoding a synchronization signal sequence from the reference signal; and
determining a timing offset based at least in part on the synchronization signal sequence, wherein the relay link is established based at least in part on the timing offset.

12. The method of claim 1, wherein establishing the relay link with the second UE comprises:
transmitting a random access request to the second UE in a random access opportunity; and
receiving a random access response from the second UE based at least in part on the random access request.

13. The method of claim 1, wherein establishing the relay link with the second UE comprises:
receiving a random access request from the second UE in a first random access opportunity or a second random access opportunity that occurs after the first random access opportunity; and
transmitting a random access response to the first UE based at least in part on the random access request.

14. The method of claim 1, further comprising:
transmitting an identifier of the second UE, beam pair information of the first beam pair, or both, to the base station.

15. The method of claim 1, wherein receiving the relay link beam sweep configuration comprises:
receiving the relay link beam sweep configuration that indicates a periodic resource in which to perform the relay link beam sweep procedure.

16. The method of claim 15, wherein the periodic resource is a configured synchronization signal block resource or differs from the configured synchronization signal block resource.

17. The method of claim 15, wherein receiving the relay link beam sweep configuration comprises:
receiving the relay link beam sweep configuration that indicates that a first plurality of UEs including the first UE to perform a transmit beam sweep procedure in a first instance of the periodic resource and a second plurality of UEs including the second UE to perform a receive beam sweep procedure in the first instance of the periodic resource.

18. The method of claim 15, wherein receiving the relay link beam sweep configuration comprises:
receiving the relay link beam sweep configuration that indicates that a first plurality of UEs including the first UE to perform a receive beam sweep procedure in a first instance of the periodic resource and a second plurality of UEs including the second UE to perform a transmit beam sweep procedure in the first instance of the periodic resource.

19. The method of claim 1, further comprising:
determining to perform the relay link beam sweep procedure based at least in part on at least one parameter.

20. The method of claim 19, wherein the at least one parameter is one or more of a network identifier, a cell identifier, a radio network temporary identifier, a temporary mobile subscriber identity, a temporary identifier, or any combination thereof.

21. The method of claim 1, further comprising:
detecting each beam pair of a plurality of beam pairs does not satisfy a threshold based at least in part on performing the relay link beam sweep procedure; and
repeating the relay link beam sweep procedure to identify the first beam pair.

22. The method of claim 21, further comprising:
waiting for a random backoff time period prior to repeat the relay link beam sweep procedure.

23. The method of claim 1, further comprising:
transmitting data to the second UE via the relay link for forwarding to the base station.

24. The method of claim 1, further comprising:
receiving data from the base station via the second UE and the relay link.

25. A method for wireless communications by a base station, comprising:
transmitting a relay link beam sweep configuration to a first user equipment (UE) and a second UE, wherein the relay link beam sweep configuration indicates a transmit beam sweep opportunity for the first UE, a receive beam sweep opportunity for the first UE, or both; and
receiving an indication of a relay link established between the first UE and the second UE based at least in part on the relay link beam sweep configuration.

26. The method of claim 25, wherein transmitting the relay link beam sweep configuration comprises:
transmitting the relay link beam sweep configuration that indicates a beam sweep opportunity parameter for indicating at least one opportunity to perform a relay link beam sweep procedure.

27. The method of claim 25, wherein transmitting the relay link beam sweep configuration comprises:
transmitting the relay link beam sweep configuration that indicates a periodic resource in which to perform a relay link beam sweep procedure.

28. The method of claim 27, wherein transmitting the relay link beam sweep configuration comprises:
transmitting the relay link beam sweep configuration that indicates that a first plurality of UEs including the first UE is to perform a first of a transmit beam sweep procedure or a receive beam sweep procedure in a first instance of the periodic resource and a second plurality of UEs including the second UE is to perform a second of the transmit beam sweep procedure or the receive beam sweep procedure in the first instance of the periodic resource.

29. An apparatus for wireless communications by a first user equipment (UE), comprising:
a processor,
memory in electronic communication with the processor; and
instructions stored in the memory and executable by the processor to cause the apparatus to:
receive a relay link beam sweep configuration from a base station for establishing a relay link with a second UE, wherein the relay link beam sweep configuration indicates a transmit beam sweep opportunity for the first UE, a receive beam sweep opportunity for the first UE, or both;
perform a relay link beam sweep procedure with the second UE using a plurality of beams based at least in part on the relay link beam sweep configuration, wherein the relay link beam sweep procedure is performed during the transmit beam sweep opportunity, the receive beam sweep opportunity, or both;

select a first beam pair based at least in part on the relay link beam sweep procedure; and establish a relay link with the second UE using the first beam pair.

30. An apparatus for wireless communications by a base station, comprising:

a processor, memory in electronic communication with the processor; and instructions stored in the memory and executable by the processor to cause the apparatus to:

transmit a relay link beam sweep configuration to a first user equipment (UE) and a second UE, wherein the relay link beam sweep configuration indicates a transmit beam sweep opportunity for the first UE, a receive beam sweep opportunity for the first UE, or both; and receive an indication of a relay link established between the first UE and the second UE based at least in part on the relay link beam sweep configuration.

* * * * *